United States Patent
Nagai et al.

(10) Patent No.: US 7,220,205 B2
(45) Date of Patent: May 22, 2007

(54) AUTOMATIC SPEED REDUCING RATIO-SWITCHING APPARATUS

(75) Inventors: Shigekazu Nagai, Adachi-ku (JP); Akio Saitoh, Kawaguchi (JP); Ryuichi Masui, Bando (JP); Masaki Imamura, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 178 days.

(21) Appl. No.: 11/146,346

(22) Filed: Jun. 6, 2005

(65) Prior Publication Data

US 2005/0272548 A1    Dec. 8, 2005

(30) Foreign Application Priority Data

Jun. 8, 2004    (JP) ............................. 2004-170263
May 13, 2005   (JP) ............................. 2005-141123

(51) Int. Cl.
*F16H 47/08* (2006.01)
(52) U.S. Cl. ..................................................... 475/91
(58) Field of Classification Search ................ 475/266, 475/299, 112, 91
See application file for complete search history.

(56) References Cited

U.S. PATENT DOCUMENTS

| 1,588,602 | A  | * | 6/1926 | Midgley ..................... 475/299 |
| 6,354,580 | B1 |   | 3/2002 | Nagai et al. |
| 2005/0022523 | A1 |   | 2/2005 | Nagai et al. |
| 2005/0054468 | A1 |   | 3/2005 | Nagai et al. |

FOREIGN PATENT DOCUMENTS

| JP | 2001-105332 | 4/2001 |
| JP | 2002-219625 | 8/2002 |
| JP | 2003-184981 | 7/2003 |
| JP | 2003-184982 | 7/2003 |
| JP | 2005-54862  | 3/2005 |
| JP | 2005-106284 | 4/2005 |

* cited by examiner

*Primary Examiner*—Dirk Wright
(74) *Attorney, Agent, or Firm*—Paul A. Guss

(57) ABSTRACT

Helical gears are used for a sun gear, planet gears, and an internal gear. Accordingly, when a load, which exceeds a preset torque, is applied to the internal gear, the internal gear is moved in a direction toward an input shaft or a direction toward an output shaft while making rotation in a direction different from that of the sun gear to automatically switch the speed reducing ratio.

20 Claims, 35 Drawing Sheets

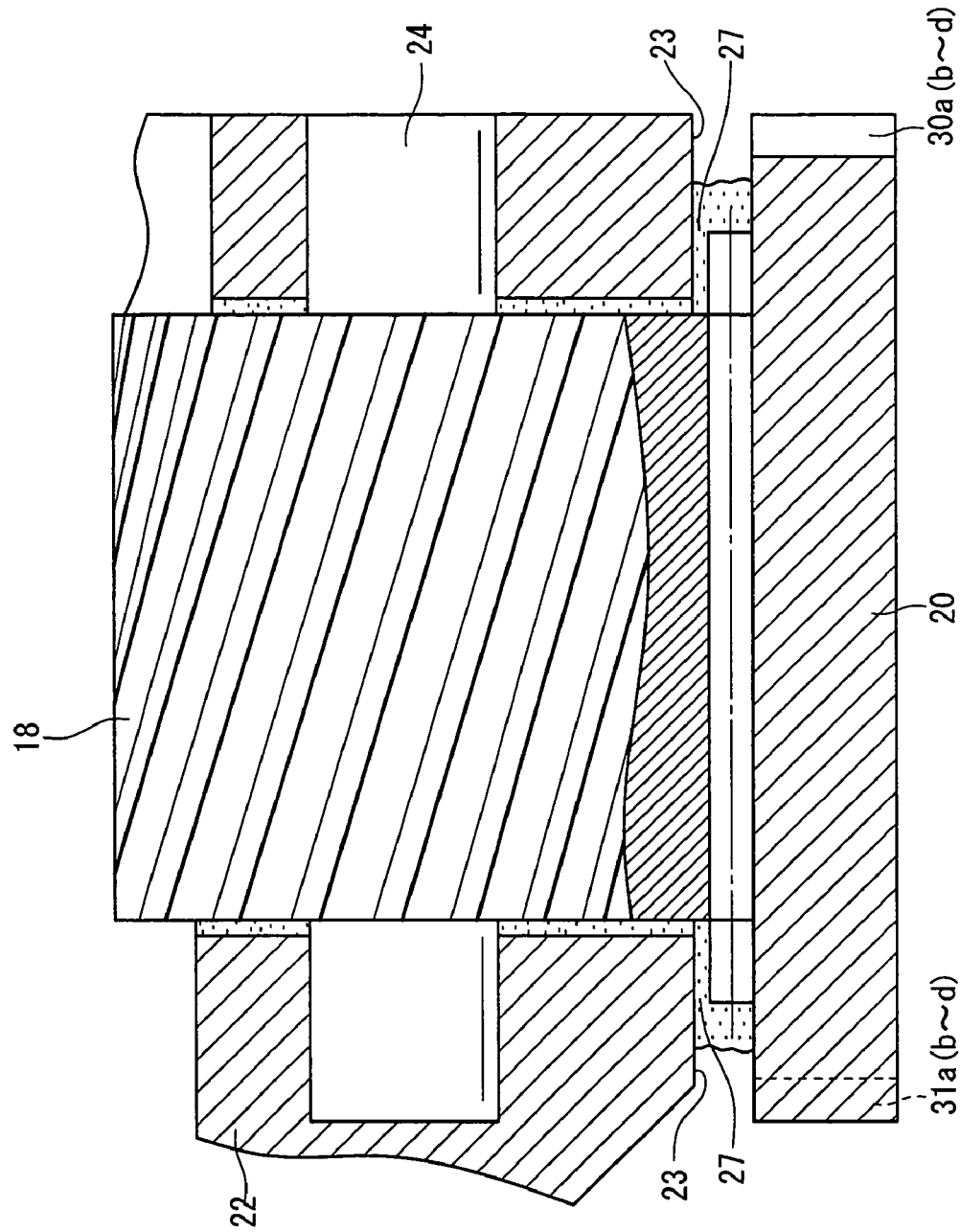

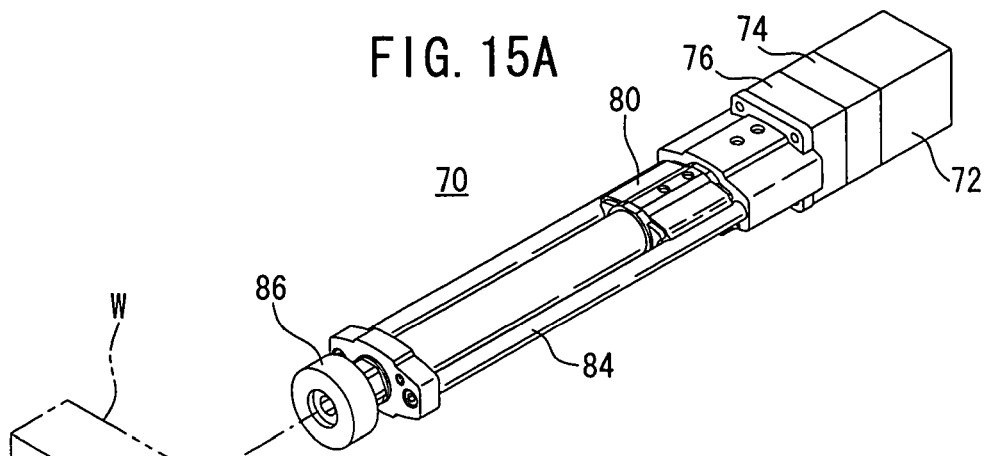
FIG. 15A
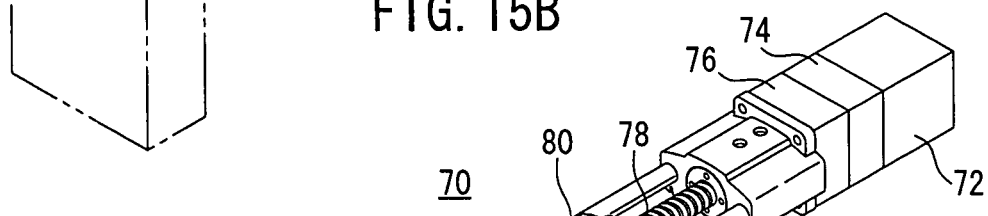
FIG. 15B
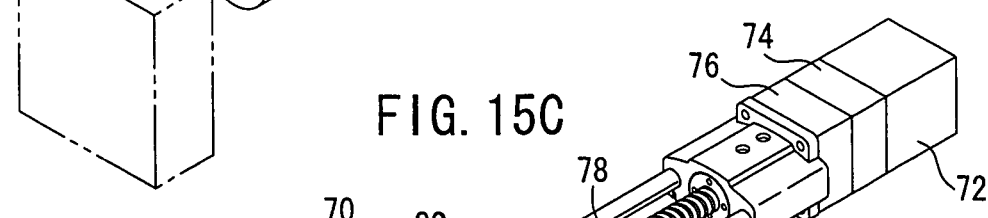
FIG. 15C
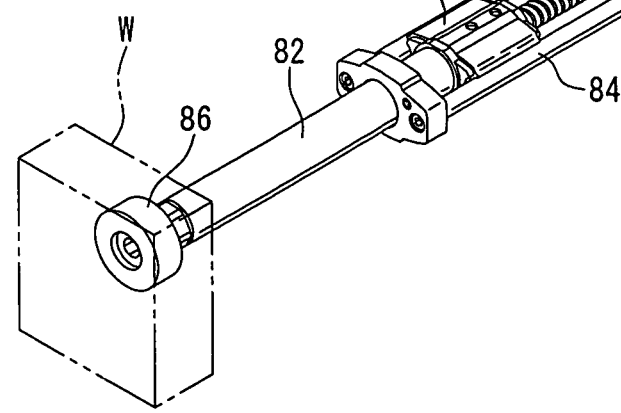

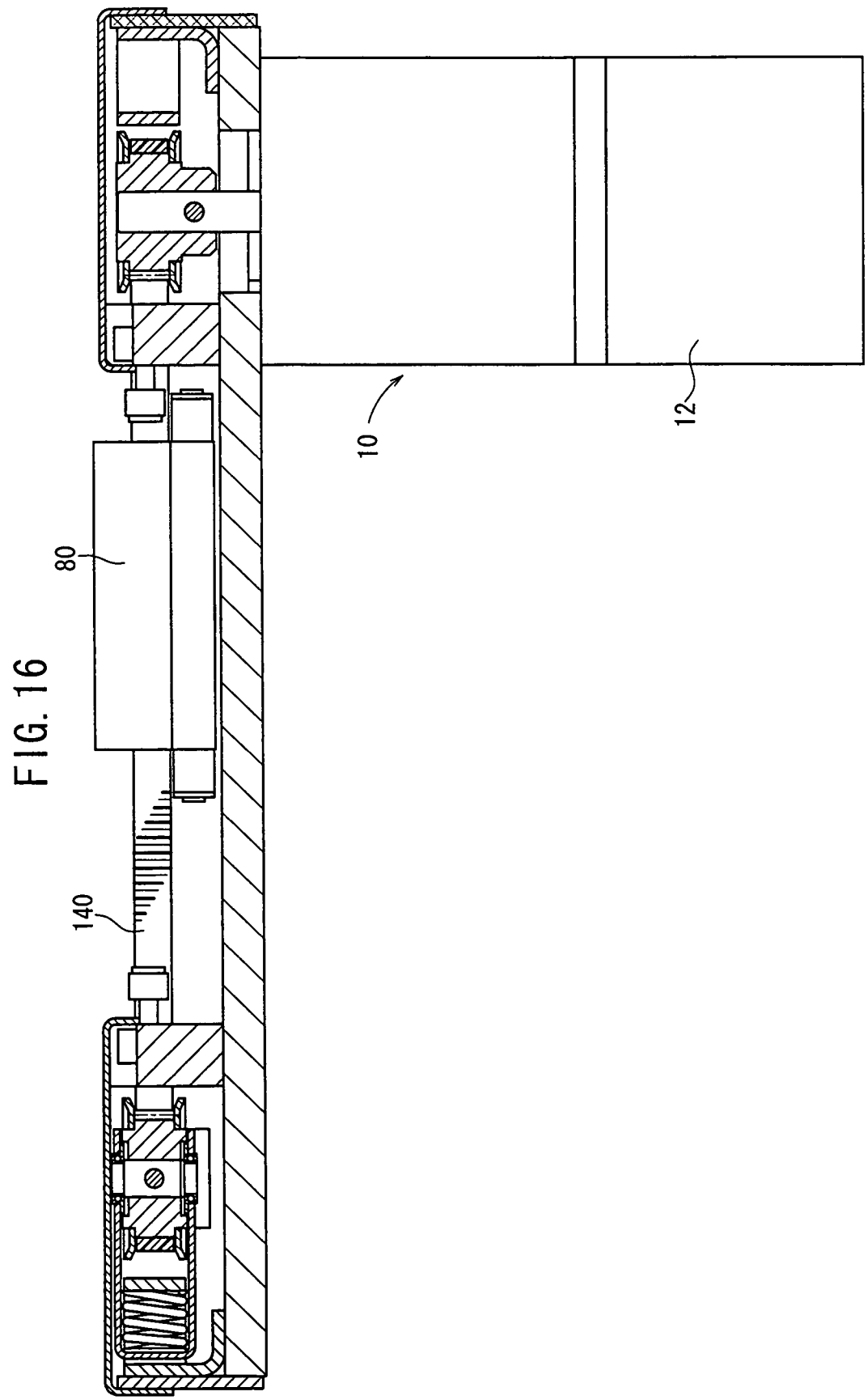

AUTOMATIC SPEED REDUCING RATIO-SWITCHING APPARATUS

BACKGROUND OF THE INVENTION

1. Field of the Invention

The present invention relates to an automatic speed reducing ratio-switching apparatus capable of automatically switching the speed reducing ratio transmitted from an output shaft to a displacement member of an actuator by using a planetary gear mechanism when a load, which exceeds a predetermined torque, is applied.

2. Description of the Related Art

Those to which the speed reducing ratio-switching mechanism has been hitherto applied include, for example, machine systems such as construction machines. In such a machine system, an electric cylinder is used as an actuator for an expansion/contraction operation system for driving a link mechanism.

In such an electric cylinder, a rotary shaft is connected to an input section of an electric motor in a casing, and a screw shaft is arranged in the rotary shaft. The screw shaft is screwed to a nut member which is rotatably supported in the casing. Two pairs of planetary gear mechanisms, which have different speed reducing ratios, are provided between the rotary shaft and the nut member. Each of the planetary gear mechanisms comprises a sun gear, and planet gears meshed with each sun gear and an internal gear provided inside the cylindrical casing to perform the planetary motion. Each of the sun gears is connected to the rotary shaft via a one-way clutch in which the direction of engagement is different to be the forward direction and the reverse direction. A planetary support shaft, which rotatably supports the planet gears of each of the planetary gear mechanism, is connected to the nut member.

In the electric cylinder, when the electric motor is driven and rotated in the forward direction, then the rotary shaft is also rotated in the forward direction, the nut member is rotated in the forward direction by the aid of the planetary gear mechanism having a small speed reducing ratio, and thus the screw shaft is moved in an expandable manner. On the other hand, when the electric motor is driven and rotated in the reverse direction, then the rotary shaft is also rotated in the reverse direction, the nut member is rotated in the reverse direction by the aid of the planetary gear mechanism having a large speed reducing ratio, and thus the screw shaft is moved in a contractible manner (see Japanese Laid-Open Patent Publication No. 2003-184982).

However, in the electric cylinder as described above, it is necessary to use the two types of planetary gear mechanisms having different speed reducing ratios in order to allow the screw shaft to perform the expanding operation and the contracting operation. In this case, the number of parts is increased, and the entire electric cylinder becomes large in size. In the planetary gear mechanism of the electric cylinder as described above, the expanding operation is performed at low speed with large thrust force, while the contracting operation is performed at high speed with small thrust force, irrelevant to the magnitude of the load torque applied to the electric cylinder. Therefore, the movement speed of the screw shaft cannot be increased to a high speed for the expanding operation even when the load torque applied to the electric cylinder is small.

SUMMARY OF THE INVENTION

A general object of the present invention is to provide an automatic speed reducing ratio-switching apparatus which makes it possible to control the torque and transmit the torque at a high speed by automatically switching the speed reducing ratio corresponding to the operation of a displacement member for constructing an actuator.

A principal object of the present invention is to provide an automatic speed reducing ratio-switching apparatus which makes it possible to reduce the number of parts and decrease the size of the entire apparatus.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4 is a partial magnified longitudinal sectional view illustrating a meshed portion between the planet gear and an internal gear;

FIG. 15A is a perspective view illustrating a state in which a displacement member of an actuator is disposed at the initial position, FIG. 15B is a perspective view illustrating a state in which the displacement member of the actuator is displaced toward a workpiece, and FIG. 15C is a perspective view illustrating a state in which the displacement member of the actuator abuts against the workpiece;

FIG. 16 is a longitudinal sectional view illustrating a state in which a movable member is displaced by using a belt;

DESCRIPTION OF THE PREFERRED EMBODIMENTS

Figure 1:
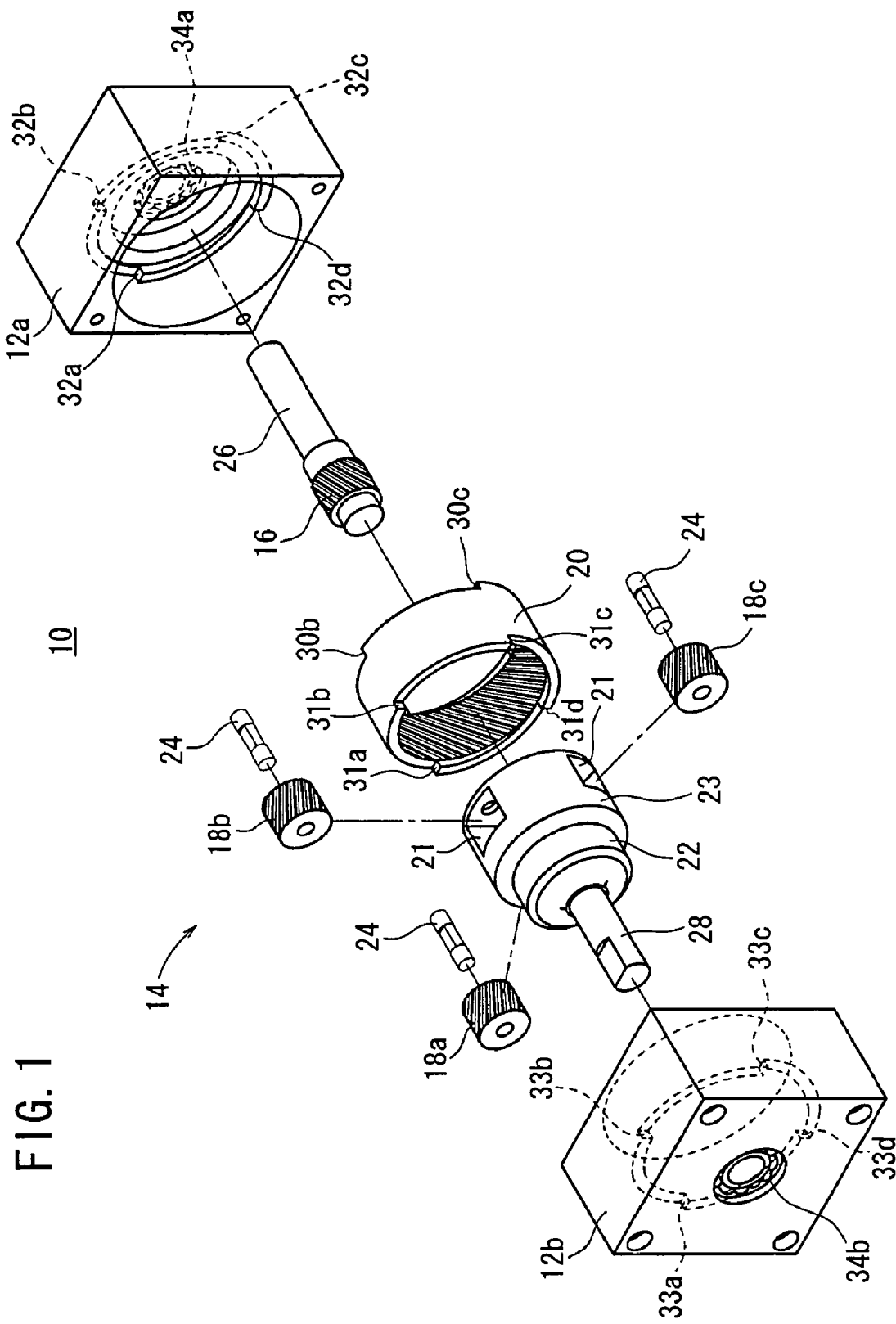
FIG. 1 is an exploded perspective view illustrating an automatic speed reducing ratio-switching apparatus according to a first embodiment of the present invention.

FIG. 1 shows an exploded perspective view illustrating an automatic speed reducing ratio-switching apparatus according to a first embodiment of the present invention. As shown in FIG. 1, the automatic speed reducing ratio-switching apparatus 10 comprises housings 12a, 12b which are constructed by being divided into two parts, and a planetary gear mechanism 14.

The housing 12a is rectangular in cross section. Lock sections 32a to 32d, which are circular arc-shaped projections to make engagement with internal gear lock receiving sections 30a to 30d as described later on when an internal gear 20 makes parallel displacement in a direction toward an input shaft 26 as described later on, are formed on an inner side of the housing 12a. Further, the housing 12a is provided with a bearing section 34a for rotatably supporting the input shaft 26. The housing 12b is rectangular in cross section in the same manner as the housing 12a. Lock sections 33a to 33d, which are circular arc-shaped projections to make engagement with internal gear lock receiving sections 31a to 31d when the internal gear 20 makes parallel displacement in a direction toward an output shaft 28 as described later on, are formed on an inner side of the housing 12b. Further, the housing 12b is provided with a bearing section 34b for rotatably supporting the output shaft 28.

Figure 3A:
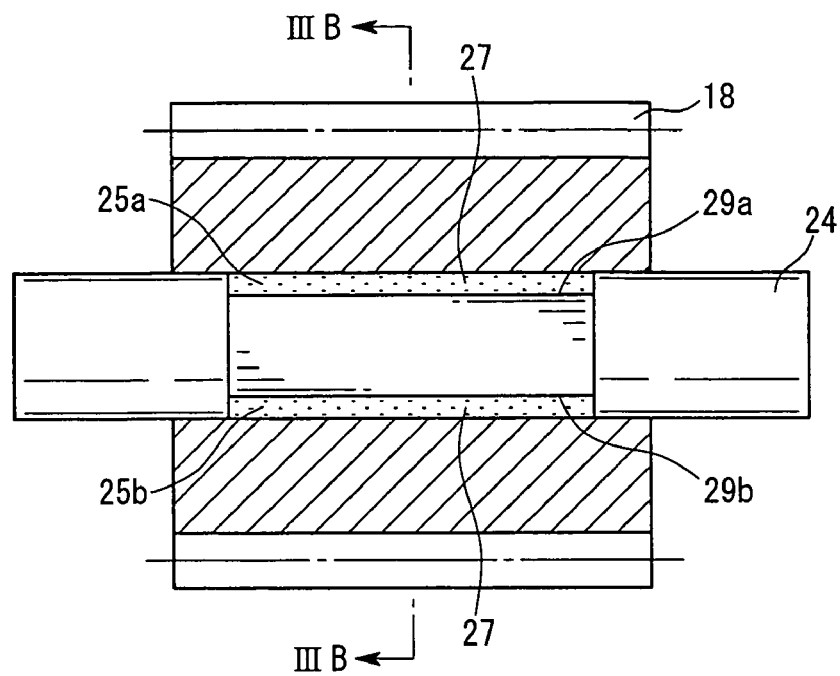
FIG. 3A is a longitudinal sectional view taken in the axial direction illustrating a planet gear for constructing the automatic speed reducing ratio-switching apparatus shown in FIG. 1.
Figure 3B:
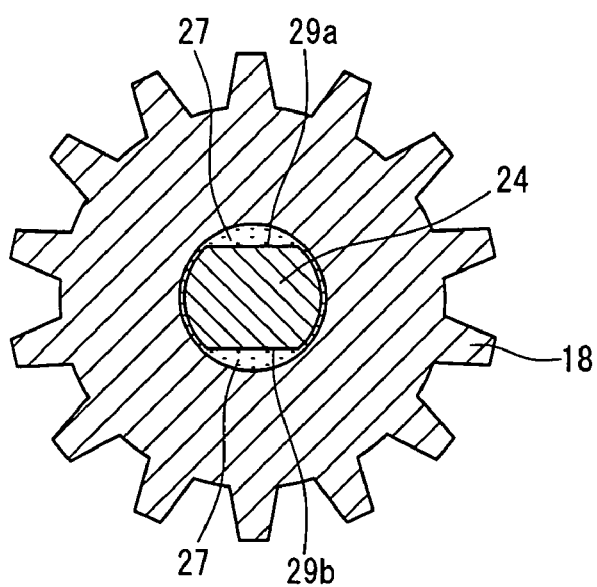
FIG. 3B is a lateral sectional view taken along a line IIIB—IIIB shown in FIG. 3A.

The planetary gear mechanism 14 comprises a sun gear 16 which is formed integrally with the input shaft 26, planet gears 18a, 18b, 18c which are meshed while being separated from each other by angles of about 120 degrees in the circumferential direction of the sun gear 16 and which make revolution and rotation, the internal gear 20, and a carrier 22. The carrier 22 has a cylindrical large diameter inner section 23, and the output shaft 28 which protrudes from the inner section 23 while being directed toward the housing 12b. The sun gear 16 is inserted into the inner section 23 facing the interior thereof. Windows 21, which are separated from each other at equal angles of 120 degrees respectively, are formed for the inner section 23. The planet gears 18a, 18b, 18c face the windows 21. In this embodiment, the planet gears 18a, 18b, 18c are rotatably supported by the carrier 22 by using pins 24. As shown in FIGS. 3A and 3B, each pin 24 is provided with cutouts 29a, 29b formed by cutting out parts of the outer circumference thereof. Clearances 25a, 25b are provided by the cutouts 29a, 29b between the planet gears 18a, 18b, 18c and each pin 24. The clearances 25a, 25b are filled, for example, with oil or grease. It is preferable that the quality of the viscosity of the oil or grease is high. The large diameter internal gear 20 is meshed on the outer circumferential sides of the planet gears 18a, 18b, 18c which are meshed with inner teeth engraved on the inner circumference of the internal gear 20. The input shaft 26, which is formed integrally with the sun gear 16, is connected to a rotary driving shaft of an unillustrated rotary driving source via a coupling member (not shown). In this arrangement, the input shaft 26 and the output shaft 28 are provided coaxially as shown in FIG. 1.

The sun gear 16, the planet gears 18a, 18b, 18c, and the internal gear 20 are composed of helical gears. In this embodiment, for example, oil or grease having a high viscosity is filled in or applied to the interstices between the planet gears 18a, 18b, 18c and the inner section 23 of the carrier 22 and between the planet gears 18a, 18b, 18c and the internal gear 20 in order to obtain viscous resistance. In order to effectively obtain the viscous resistance, it is preferable that the clearance 27 between the inner section 23 and the tooth edge of the internal gear 20 is not more than 0.1 mm (see FIG. 4).

The angle of torsion of each of the helical gears for constructing the sun gear 16, the planet gears 18, and the internal gear 20 is not specifically limited. However, it is preferable that the angle of torsion is about 300 to 40°. The viscosity of the oil, grease or the like to be used as the viscous resistance member is not specifically limited. However, it is preferable that the viscosity is about 10,000 to 100,000 (cSt). Further, the viscous resistance of the viscous resistance member can be also changed by the shear rate as well as by the width of the clearance and the viscosity of the grease or the like as described above.

Figure 14:
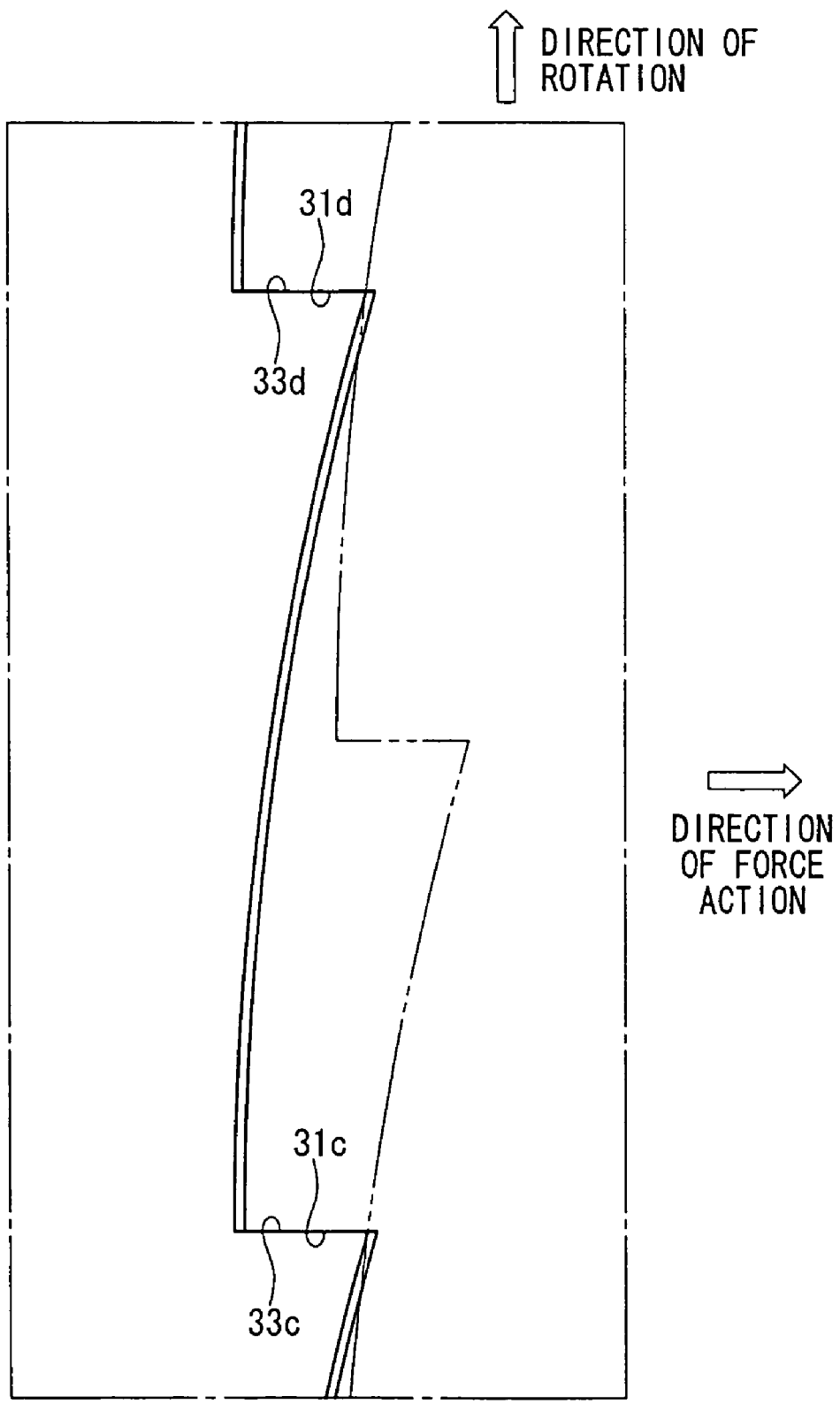
FIG. 14 is a partial magnified view illustrating a portion at which an internal gear clutch and a lock section are meshed with each other with reference to FIG. 8.

A plurality of internal gear lock receiving sections 30a to 30d, 31a to 31d, which protrude while being curved respectively, are formed at ends of the cylindrical shape of the internal gear 20. As shown in FIG. 14, the internal gear lock receiving sections 30a to 30d, 31a to 31d have projecting shapes to depict curves in the circumferential direction corresponding to the lock sections 32a to 32d, 33a to 33d. The internal gear lock receiving sections 30a to 30d, 31a to 31d and the lock sections 32a to 32d, 33a to 33d function as an internal gear lock mechanism.

When the input shaft 26, the internal gear 20, and the carrier 22 constructed as described above are assembled, then the input shaft 26 is firstly inserted into the bearing section 34a of the housing 12a, the output shaft 28 is inserted into the bearing section 34b of the housing 12b, and the internal gear 20 is fitted on the outer side of the carrier 22. The housing 12a and the housing 12b are joined to one another so that the sun gear 16 of the input shaft 26 is meshed with the planet gears 18a, 18b, 18c, followed by being screwed. Accordingly, the planetary gear mechanism 14 is accommodated in the housings 12a, 12b (see FIG. 5).

Figure 2:
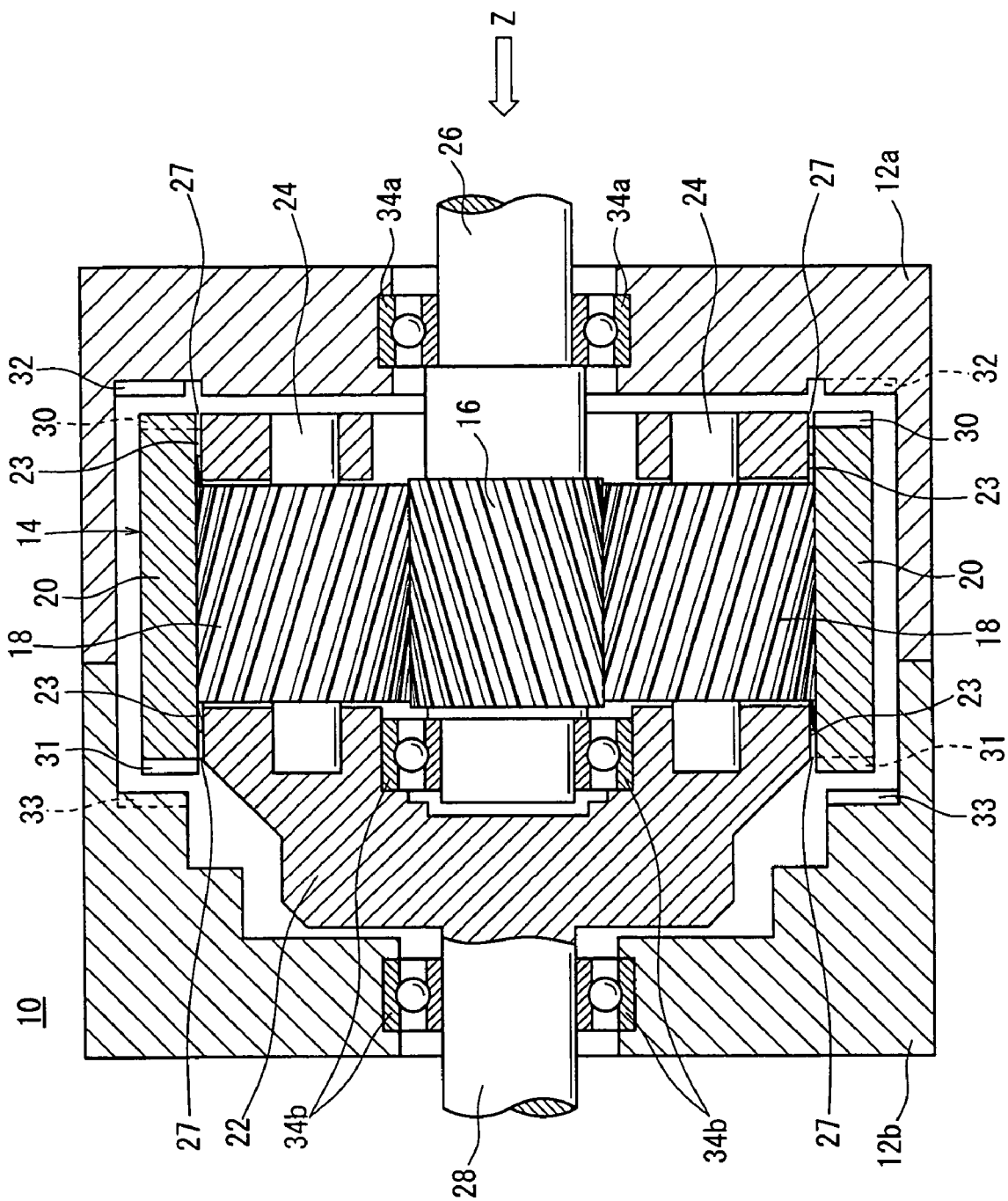
FIG. 2 is a longitudinal sectional view taken in the axial direction illustrating the automatic speed reducing ratio-switching apparatus according to the first embodiment of the present invention.

Next, an explanation will be made about the operation of the automatic speed reducing ratio-switching apparatus 10. At first, the unillustrated rotary driving source is energized, and the rotary driving force of the rotary driving source is transmitted via the input shaft 26 to the sun gear 16. It is assumed that the rotary driving force rotates the input shaft 26 and the sun gear 16 in the clockwise direction as viewed in the direction from the input shaft 26 to the output shaft 28 (direction of the arrow Z shown in FIG. 2).

Figure 6:
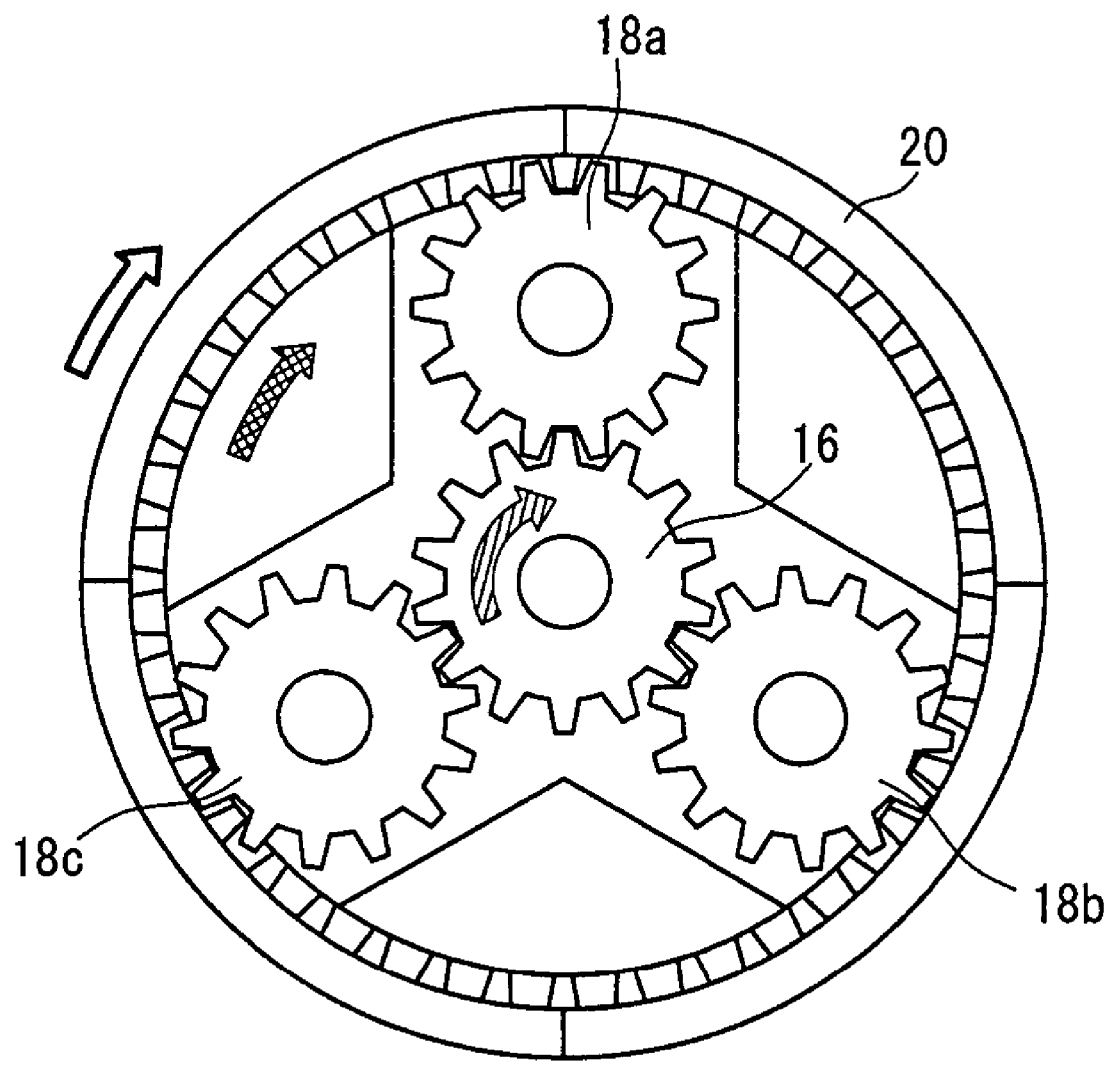
FIG. 6 is a side view illustrating a sun gear, the planet gears, and the internal gear in a state of high speed rotation.

When the rotational force at a low load is transmitted to the input shaft 26, then the planet gears 18a, 18b, 18c make revolution in the direction of the meshed arrow of FIG. 6 (and other figures) without making rotation, the internal gear 20 also makes revolution in the direction of the bold arrow of FIG. 6 (and other figures), and the carrier 22 also makes revolution in an integrated manner in the clockwise direction (see FIG. 6), because the viscous resistance member is used among the sun gear 16, the planet gears 18a, 18b, 18c, the inner section 23, and the internal gear 20, and hence the static frictional force is exerted by the viscous resistance of the viscous resistance member. That is, with reference to FIG. 6 (and other figures), when the sun gear 16 is rotated in the direction of the hatched arrow, the static frictional force is exerted by the viscous resistance member between the inner section 23 and the internal gear 20 because of the low rotation. Consequently, the inner section 23, the internal gear 20, the planet gears 18a, 18b, 18c, and the sun gear 16 are rotated in an integrated manner.

Subsequently, when the load, which exceeds a preset torque, is applied to the carrier 22 via the output shaft 28, then the sun gear 16 is rotated, the planet gears 18 make no revolution but make rotation thereby in the counterclockwise direction (direction of the blank arrow) opposite to the direction of the sun gear 16, and the internal gear 20, which is meshed with the planet gears 18, is rotated in the counterclockwise direction (see FIG. 7). That is, when the rotation speed is lowered by the load applied to the output shaft 28, the rotation speed of the carrier 22 formed integrally with the output shaft 28 is also lowered. However, the internal gear 20 still rotates in the same manner. In other words, the rotation speed of the internal gear 20 is larger than the rotation speed of the carrier 22. Therefore, the viscous resistance is increased between the internal gear 20 and the carrier 22. As the viscous resistance is increased as described above, the thrust force is generated in the direction of the stripes of teeth, and the internal gear 20 is moved in the direction of the arrow Z1 as shown in FIG. 8, because the planet gears 18a, 18b, 18c and the internal gear 20 meshed therewith are the helical gears.

Figure 9:
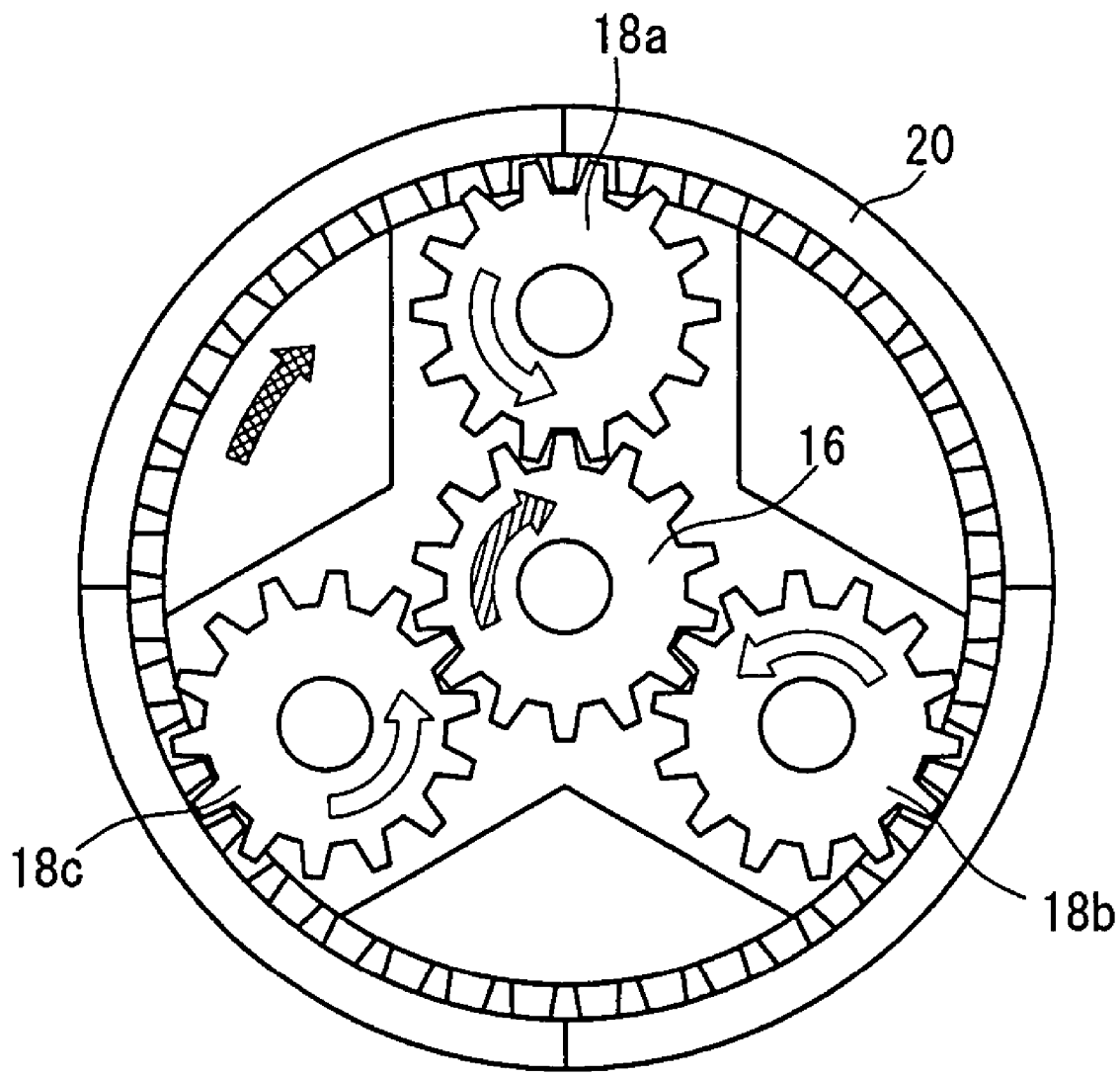
FIG. 9 is a side view illustrating the sun gear, the planet gears, and the internal gear in the locked state as described above.

As a result, the internal gear lock receiving section 31b is meshed with the lock section 33b, and the internal gear lock receiving section 31c is meshed with the lock section 33c. The internal gear 20 is in the locked state, making it impossible to effect any further movement. When the internal gear 20 is in the locked state, then the sun gear 16 makes rotation in the direction of the hatched arrow shown in FIG. 6, and thus the planet gears 18a, 18b, 18c make revolution together with the carrier 22 (see FIG. 9) while making rotation in the counterclockwise direction to transmit the decelerated rotation speed and the increased torque to the output shaft 28. In this situation, the torque resides in the force corresponding to the gear ratio between the planet gears 18a, 18b, 18c and the internal gear 20.

Figure 10:
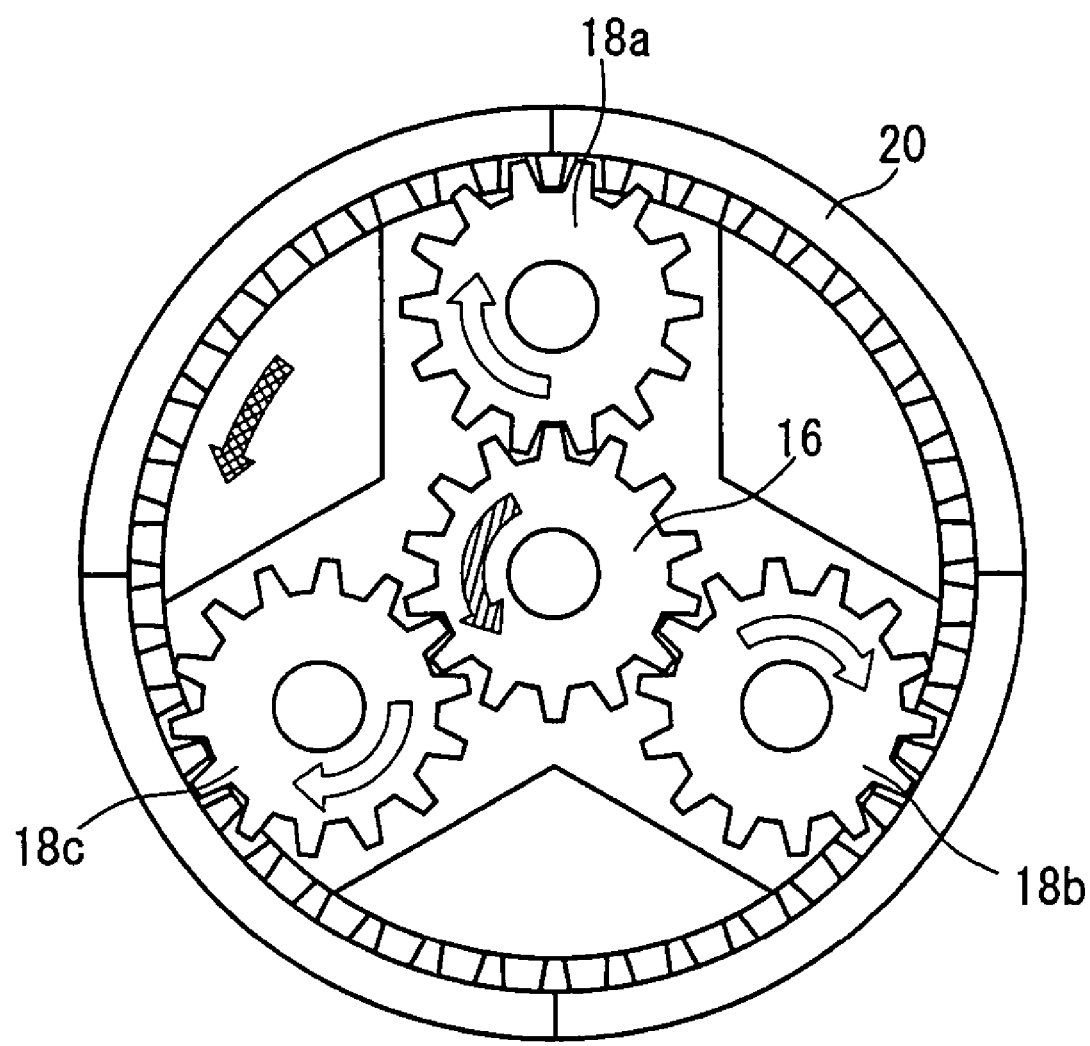
FIG. 10 is a side view illustrating the sun gear, the planet gears, and the internal gear immediately after reversing the sun gear.

Subsequently, the rotary driving direction is reversed in order to release the internal gear 20 from the locked state. That is, the sun gear 16 is rotated in the counterclockwise direction by the aid of the input shaft 26. As a result, as shown in FIG. 10, the planet gears 18a, 18b, 18c make revolution in the counterclockwise direction together with the carrier 22 while making rotation in the clockwise direction in accordance with the rotation of the sun gear 16 (see FIG. 10). The internal gear 20 is in the locked state, i.e., in the stopped state immediately after the sun gear 16 starts to rotate in the counterclockwise direction. Therefore, the difference in the number of relative rotations appears between the carrier 22 and the internal gear 20, and thus the viscous resistance is increased between the internal gear 20 and the inner section 23. Because the viscous resistance is increased between the internal gear 20 and the inner section 23 and also because the planet gears 18a, 18b, 18c and the internal gear 20 are the helical gears, the thrust force is generated in the direction of the stripes of teeth formed helically on the cylindrical surfaces of the gears. The thrust force causes the internal gear 20 to make parallel displacement in the direction opposite to the Z1 direction. The internal gear 20 makes the parallel displacement in the direction opposite to the Z1 direction while making rotation in the clockwise direction, the internal gear lock receiving sections 30 of the internal gear 20 are separated from the lock sections 32 of the housing 12b, and the internal gear 20 is released from the locked state.

Figure 5:
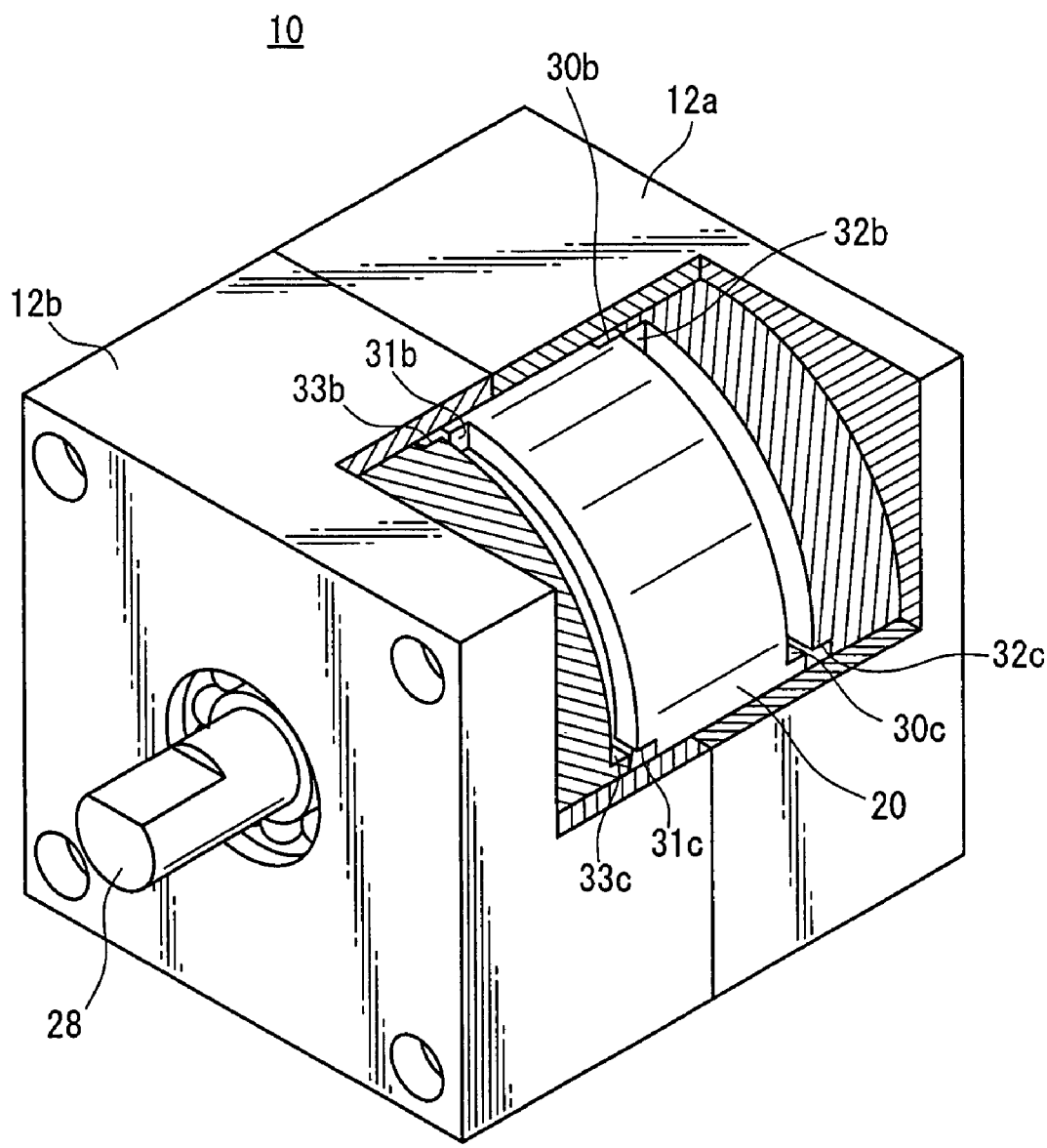
FIG. 5 is, with partial cutout, a perspective view illustrating the automatic speed reducing ratio-switching apparatus according to the first embodiment of the present invention.

As described above, when the internal gear 20 is released from the locked state, the planet gears 18a, 18b, 18c, the internal gear 20, and the carrier 22 make revolution in the counterclockwise direction around the sun gear 16 in an integrated manner again in conformity with the rotation of the sun gear 16 in the counterclockwise direction (see FIG. 11) to return to the initial position shown in FIG. 5. That is, when the sun gear 16 is rotated at a high speed in the counterclockwise direction after the internal gear 20 is released from the locked state, then the planet gears 18a, 18b, 18c make revolution in the counterclockwise direction without causing rotation thereof, and the internal gear 20 makes rotation in the counterclockwise direction as well.

The foregoing case is illustrative of the state in which the input shaft 26 and the sun gear 16 are rotated in the clockwise direction. However, the same or equivalent operation and effect are also achieved when the input shaft 26 and the sun gear 16 are rotated in the counterclockwise direction.

That is, when the input shaft 26 and the sun gear 16 are rotated in the counterclockwise direction, and the load, which exceeds the preset torque, is applied to the carrier 22 via the output shaft 28 in this state, then the internal gear lock receiving section 30b is meshed with the lock section 32b, the internal gear lock receiving section 30c is meshed with the lock section 32c, and the internal gear 20 is in the locked state. Further, when the rotary driving force is reversed to rotate the sun gear 16 in the clockwise direction by the aid of the input shaft 26, the internal gear 20 is released from the locked state to return to the initial state shown in FIG. 5.

Figure 13:
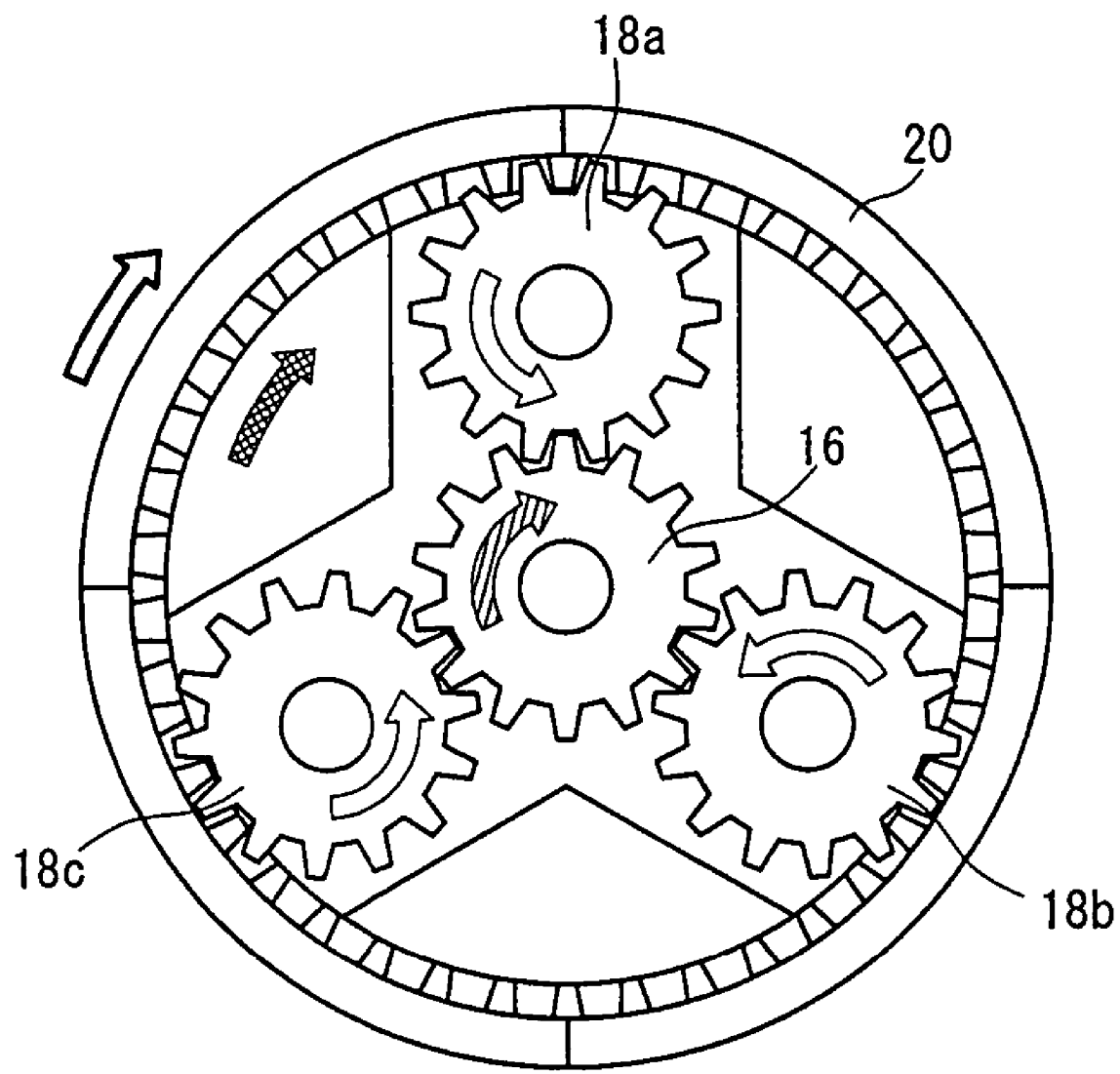
FIG. 13 is a side view illustrating the directions of rotation of the sun gear, the planet gears, and the internal gear in a state in which the load on the output shaft is decreased with reference to FIG. 8.

On the other hand, when the internal gear 20 is in the locked state as shown in FIG. 8, the internal gear 20 can be released from the locked state by decreasing the load applied to the output shaft 28. That is, in the state in which the load on the output shaft 28 is decreased, the planet gears 18a, 18b, 18c make revolution in the clockwise direction together with the carrier 22 while making rotation in the counterclockwise direction in accordance with the rotation of the sun gear 16 in the clockwise direction, and the internal gear 20, which is meshed with the planet gears 18a, 18b, 18c, is rotated in the clockwise direction (see FIG. 13). In this state, the rotation speed of the internal gear 20 becomes smaller than the rotation speed of the carrier 22 due to the viscous resistance member disposed between the internal gear 20 and the inner section 23, and the difference in the number of relative rotations appears between the carrier 22 and the internal gear 20. As a result, the viscous resistance is increased between the internal gear 20 and the inner section 23. Because the viscous resistance is increased between the internal gear 20 and the inner section 23 and also because the planet gears 18a, 18b, 18c and the internal gear 20 are the helical gears, the thrust force is generated in the direction of the stripes of teeth formed helically on the cylindrical surfaces of the gears.

Further, as shown in FIG. 14, each of the internal gear lock receiving section 31c and the lock section 33c has such a shape that a curve is depicted in the circumferential direction. Therefore, when the internal gear 20 is rotated in the clockwise direction, then the force is exerted together with the thrust force in the direction opposite to the Z1 direction, and the internal gear 20 makes parallel displacement. That is, the internal gear 20 makes the parallel displacement in the direction opposite to the Z1 direction while making rotation in the clockwise direction, the internal gear lock receiving sections 31a to 31d are separated from the lock sections 33a to 33d, and the internal gear 20 is released from the locked state.

In the automatic speed reducing ratio-switching apparatus 10 according to the first embodiment, the helical gears are used for the sun gear 16, the planet gears 18, and the internal gear 20, and the viscous resistance member is provided between the internal gear 20 and the inner section 23 provided for the carrier 22. Accordingly, when the load, which exceeds the preset torque, is applied to the carrier 22, the internal gear 20 makes the parallel displacement in the direction toward the input shaft 26 or the direction toward the output shaft 28 on the basis of the difference in the relative rotation speed between the internal gear 20 and the carrier 22. Thus, it is possible to automatically switch the speed reducing ratio transmitted from the output shaft 28 to the displacement member of the actuator. When the displacement member of the actuator is once stopped in the outward route, and then the displacement member is displaced again in the direction along the outward route, then the internal gear 20 can be also released from the locked state with ease, and the speed reducing ratio can be automatically changed. Further, the displacement member of the actuator can be displaced along the outward route at the low torque and the high speed.

Next, an explanation will be made with reference to FIGS. 15A to 15C about a pressing apparatus 70 (actuator) incorporating the automatic speed reducing ratio-switching apparatus 10 according to the first embodiment of the present invention.

The pressing apparatus 70 (actuator) is an apparatus for pressing the workpiece W, when necessary. The pressing apparatus 70 basically comprises an electric motor 72, an automatic speed reducing unit 74, a fixed speed reducing ratio speed reducing unit 76, a feed screw shaft 78, a movable member 80, a pipe 82, and a guide 84. The movable member 80 and the pipe 82 function as the displacement member of the actuator.

In the pressing apparatus 70, the feed screw shaft 78 is rotated by the aid of the automatic speed reducing unit 74 and a fixed speed reducing ratio speed reducing unit 76 under the energizing action of the electric motor 72 as the rotary driving source. A feed nut (not shown) of the movable member 80, which has a screw groove, is guided by the guide 84 and moved in the axial direction of the feed screw shaft 78. The movable member 80 is connected to the pipe 82 which has a pressing section 86 at the forward end to make abutment against the workpiece W in order to press the workpiece W. The interior of the pipe 82 is hollow. In this structure, the feed screw shaft 78 is inserted through the hollow interior of the pipe 82.

When the electric motor 72 is driven, the rotational force of the electric motor 72 at a low load rotates the sun gear 16. As a result, the planet gears 18, the internal gear 20, and the carrier 22 make revolution around the sun gear 16 in an integrated manner in the clockwise direction (see FIG. 6). Accordingly, the rotation, which corresponds to the number of rotations of the input shaft 26, is transmitted to the output shaft 28 to cause the high speed rotation. The rotation is transmitted from the output shaft 28 via the fixed speed reducing ratio speed reducing unit 76 to rotate the feed screw shaft 78. The feed nut of the movable member 80, which has the screw groove, is guided by the guide 84 and moved in the axial direction of the feed screw shaft 78. Accordingly, the pressing section 86 is displaced at a high speed from the initial position shown in FIG. 15A toward the workpiece W (see FIG. 15B).

As shown in FIG. 15C, the displacing pressing section 86 abuts against the workpiece W, and the load, which exceeds a preset torque, is applied from the pressing apparatus 70 via the output shaft 28 to the carrier 22. In this situation, the sun gear 16 is rotated, and thus the planet gears 18a, 18b, 18c make rotation in the counterclockwise direction which is opposite to the direction of the sun gear 16, while the planet gears 18a, 18b, 18c do not make revolution. The internal gear 20, which is meshed with the planet gears 18a, 18b, 18c, is rotated in the counterclockwise direction (see FIG. 7). As a result, the thrust force acts on the internal gear 20, and the internal gear 20 makes parallel displacement in the Z1 direction.

As a result of the parallel displacement of the internal gear 20 in the Z1 direction, as shown in FIG. 8, the internal gear lock receiving section 31b is meshed with the lock section 33b, the internal gear lock receiving section 31c is meshed with the lock section 33c, and the internal gear 20 is in the locked state. When the internal gear 20 is in the locked state, then the planet gears 18 make revolution in the clockwise direction together with the carrier 22 while making rotation in the counterclockwise direction in accordance with the rotation of the sun gear 16 (see FIG. 9), and the increased torque is transmitted via the output shaft 28 to the pressing section 86 of the pressing apparatus 70. Accordingly, the workpiece W is pressed by the pressing section 86 (see FIG. 15C), and the pressing processing is performed for the workpiece W, and/or operation for moving the position of the workpiece W is performed.

The speed reducing ratio, which is obtained in the locked state of the internal gear 20, is represented by $1/(1+Z(C)/Z(A))$ provided that $Z(A)$ represents the number of teeth of the sun gear 16, and $Z(C)$ represents the number of teeth of the internal gear 20. The output torque, which is derived from the output shaft 28, is $(1+Z(C)/Z(A))$ times the input torque introduced from the input shaft 26. For example, when the number of teeth of the sun gear 16 is 12, and the number of teeth of the internal gear 20 is 66, then the 6.5-fold high torque is obtained.

When the polarity of the current supplied to the electric motor 72 is reversed after the workpiece W is pressed by the pressing section 86 as described above, the sun gear 16 is rotated in the counterclockwise direction by the aid of the input shaft 26. The planet gears 18a, 18b, 18c make revolution in the counterclockwise direction together with the carrier 22 while making rotation in the clockwise direction in accordance with the rotation of the sun gear 16 (see FIG. 10). As a result, the thrust force acts on the internal gear 20. The internal gear 20 makes parallel displacement in the direction opposite to the Z1 direction while making rotation in the clockwise direction. The internal gear lock receiving sections 30 of the internal gear 20 are separated from the lock sections 32 of the housing 12b, and the internal gear 20 is released from the locked state.

Figure 11:
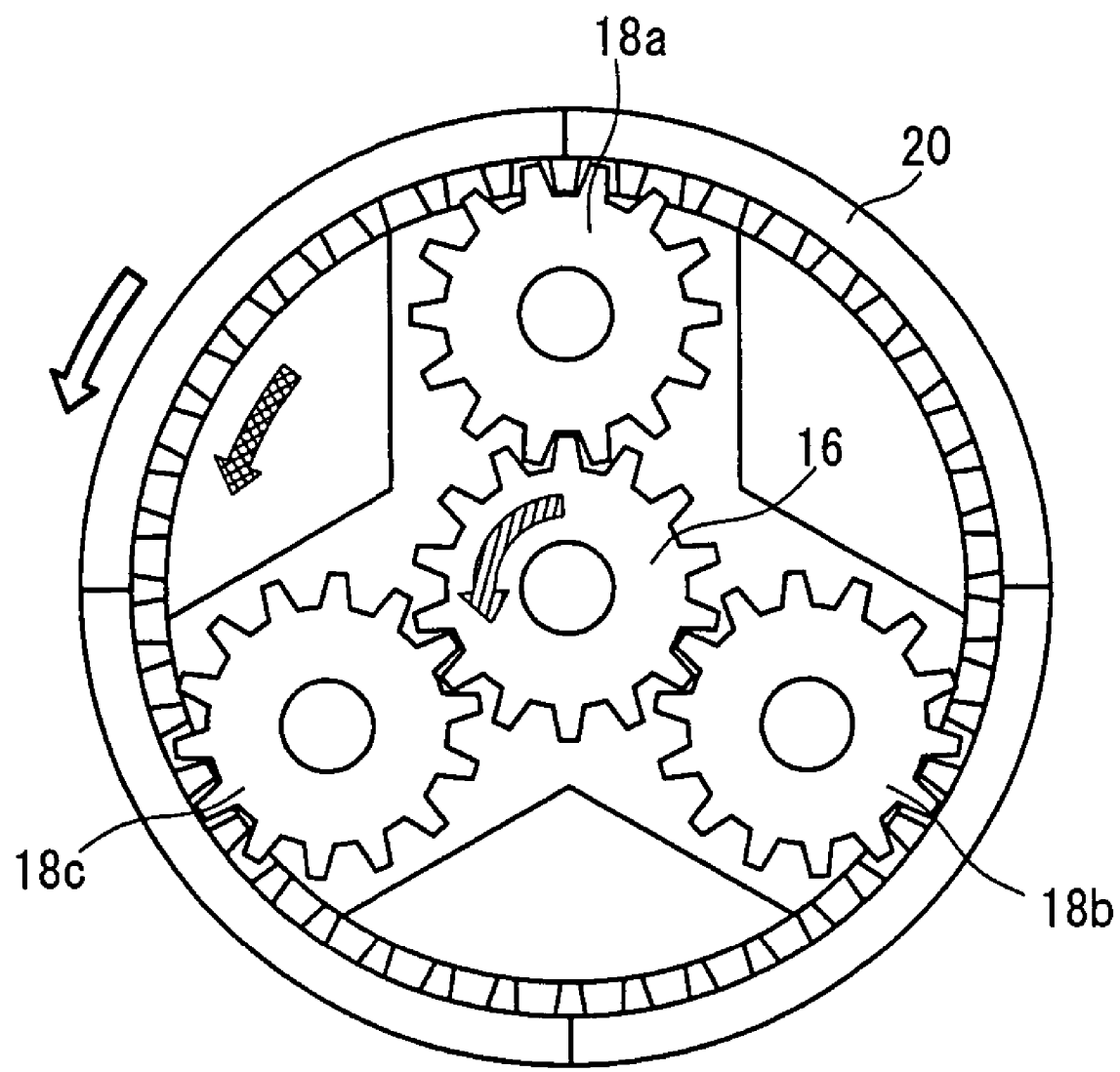
FIG. 11 is a side view illustrating the sun gear, the planet gears, and the internal gear in a state in which the sun gear is reversed and rotated at a high speed.
Figure 12:
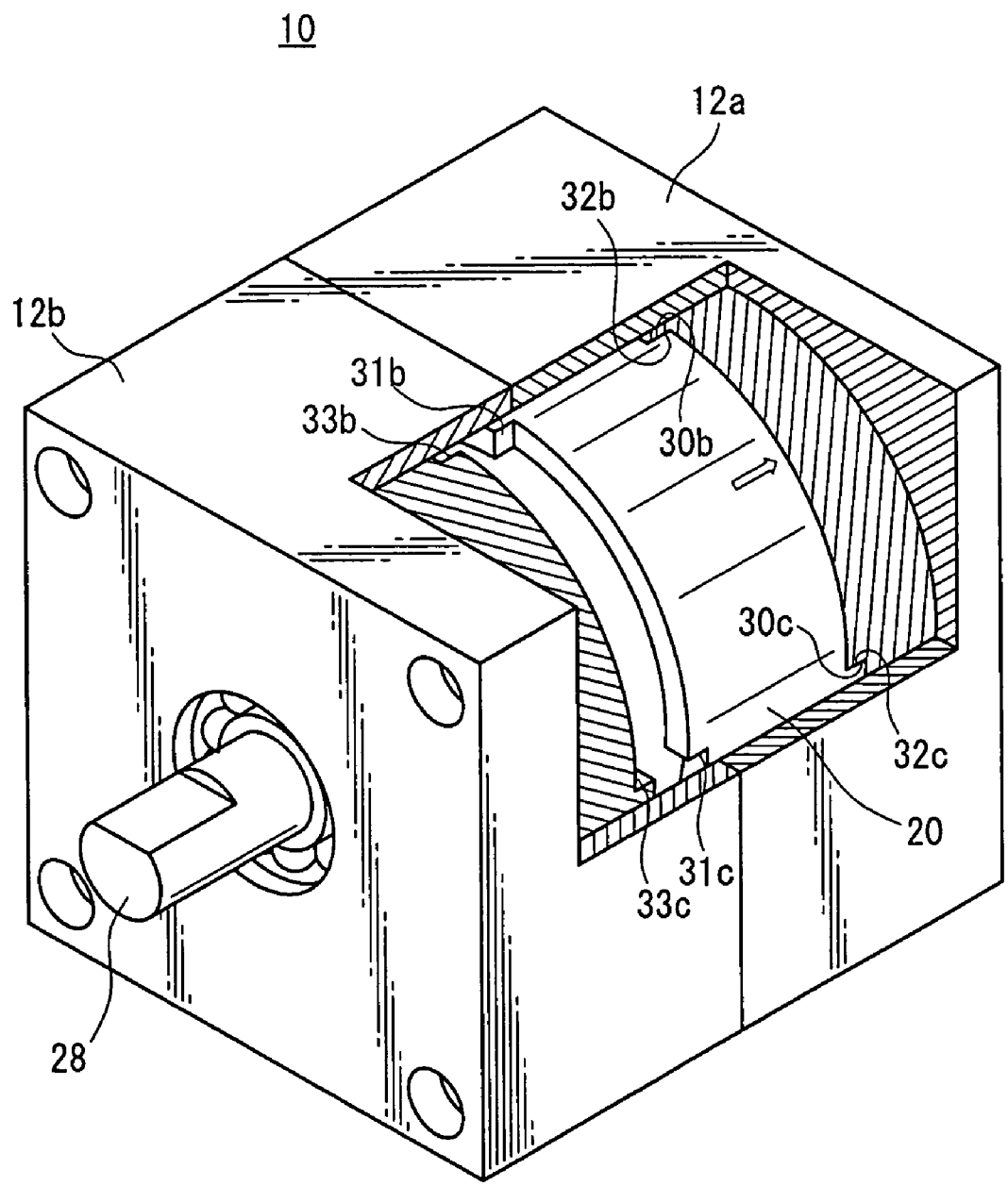
FIG. 12 is, with partial cutout, a perspective view illustrating the locked state of the automatic speed reducing ratio-switching apparatus according to the first embodiment of the present invention.

When the internal gear 20 is released from the locked state, the planet gears 18a, 18b, 18c, the internal gear 20, and the carrier 22 again make revolution in the counterclockwise direction around the sun gear 16 in an integrated manner in conformity with the rotation of the sun gear 16 in the counterclockwise direction (see FIG. 11). As a result, the rotation speed, which corresponds to the input shaft 26, is directly transmitted to the output shaft 28 to cause high speed rotation. The pressing section 86 is moved at a high speed while being guided by the guide 84 in the direction to make separation from the workpiece W. Thus, it is possible to return to the initial position shown in FIG. 15A.

According to the automatic speed reducing ratio-switching apparatus 10 of the first embodiment, when the load, which exceeds the preset torque, is applied from the actuator via the output shaft 28 to the carrier 22, the internal gear 20, which has been rotated in the same direction of rotation as that of the sun gear 16, is rotated in the direction different from that of the sun gear 16. Accordingly, the internal gear lock receiving sections 30a to 30d, 31a to 31d are meshed with the lock sections 32a to 32d, 33a to 33d, the rotation of the internal gear 20 is stopped, and the internal gear 20 is locked. When the internal gear 20 is in the locked state, then the speed reducing ratio, which is transmitted via the output shaft 28, is automatically switched, and the displacement member of the actuator is displaced at the high torque and the low speed. On the other hand, in order to change the displacement direction of the displacement member from the outward route to the returning route, the polarity of the current of the rotary driving source is reversed. By doing so, the sun gear 16 is reversed as described above, and the internal gear 20 is released from the locked state. Therefore, the speed reducing ratio, which is transmitted from the output shaft 28 to the displacement member for constructing the actuator, is automatically switched. The displacement member can be displaced along the returning route at the low torque and the high speed.

In the first embodiment described above, the electric motor 72 and the movable member 80 are connected to one another by the feed screw shaft 78 to transmit the rotational force of the electric motor 72. However, there is no limitation to the feed screw shaft 78 described above. For example, the movable member 80 may be displaced with a belt 140 (see FIG. 16) as disclosed in Japanese Laid-Open Patent Publication No. 2005-106284.

Figure 17:
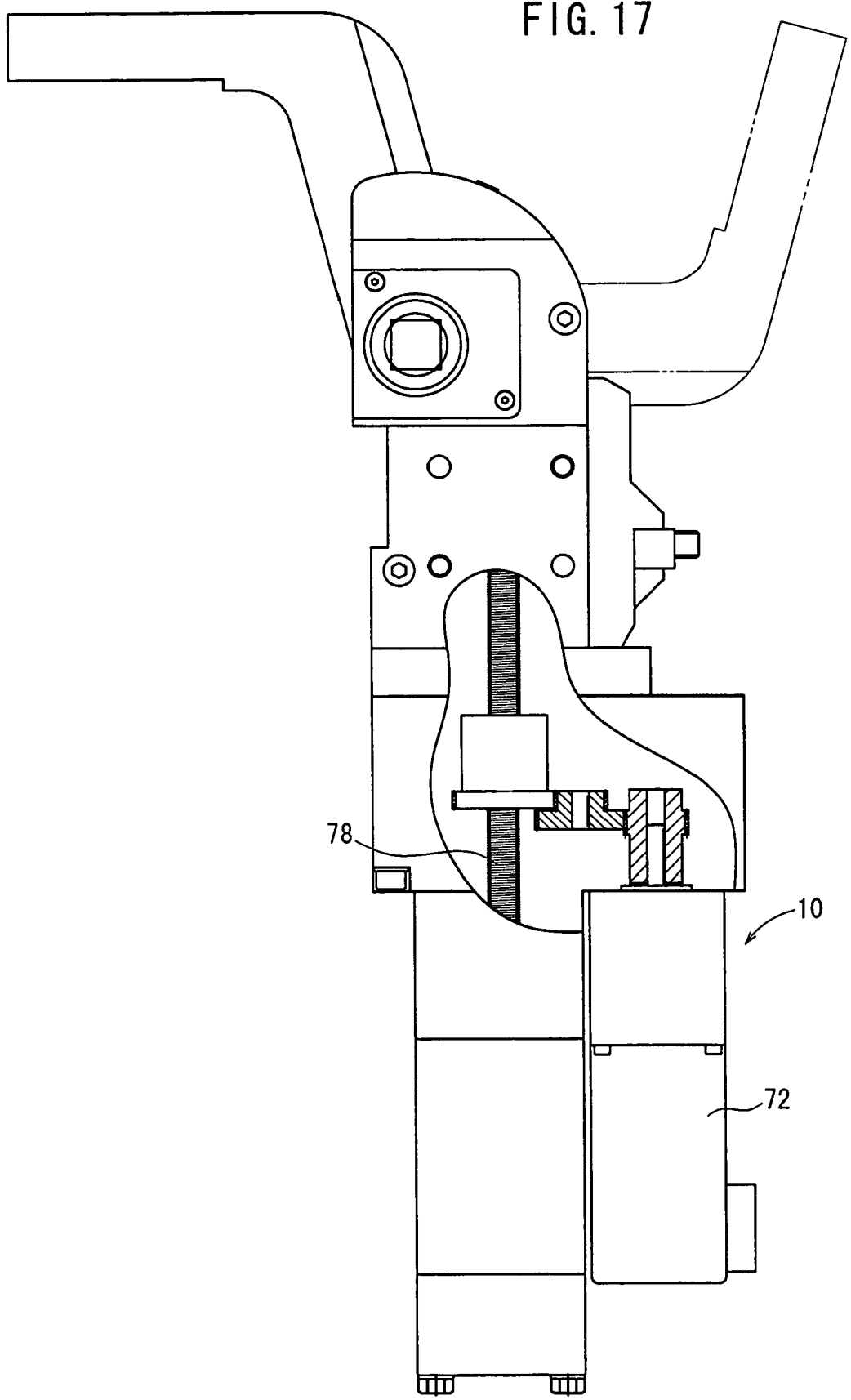
FIG. 17 is, with partial cutaway, a side view illustrating an electric clamp apparatus.
Figure 18:
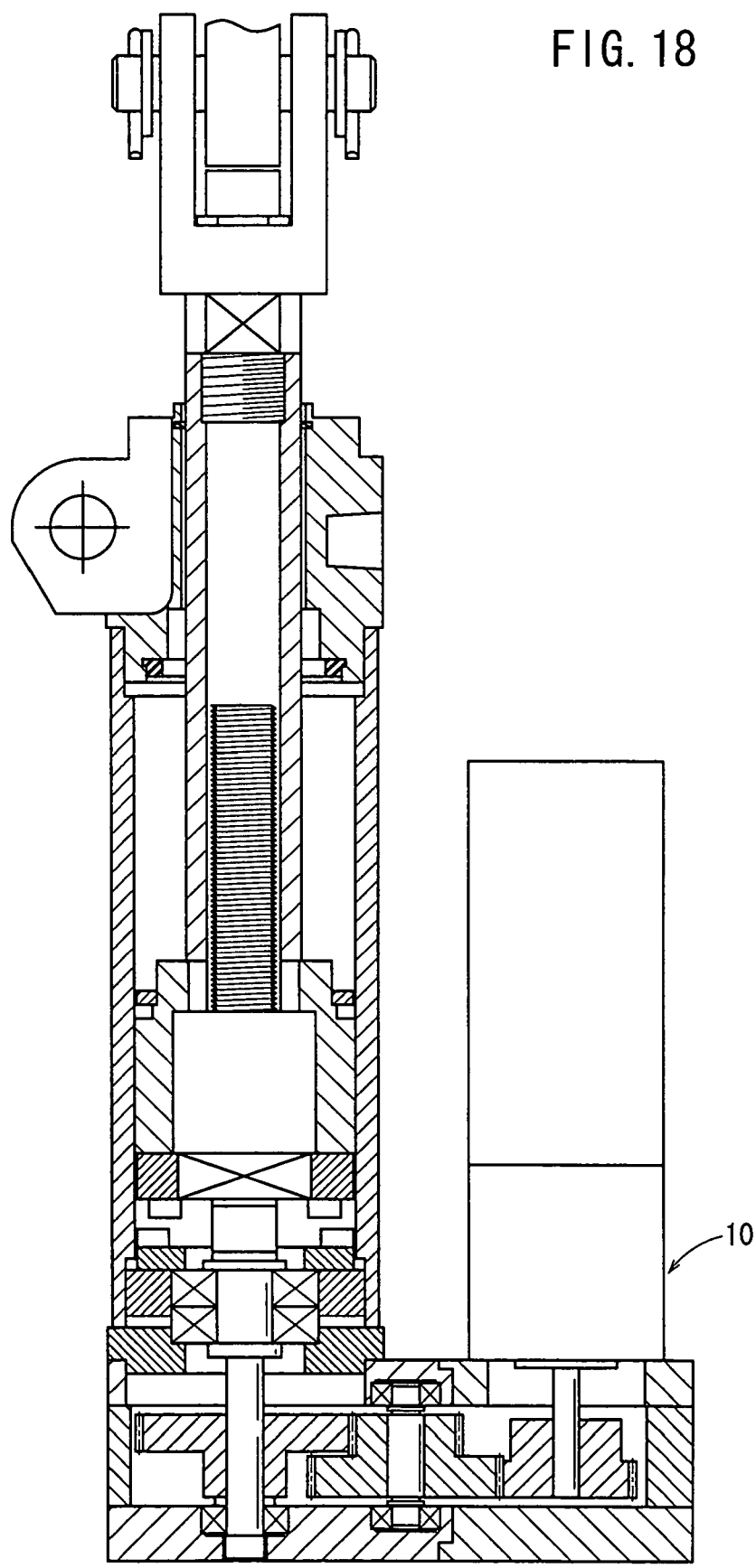
FIG. 18 is a longitudinal sectional view taken in the axial direction illustrating the electric clamp apparatus.
Figure 19:
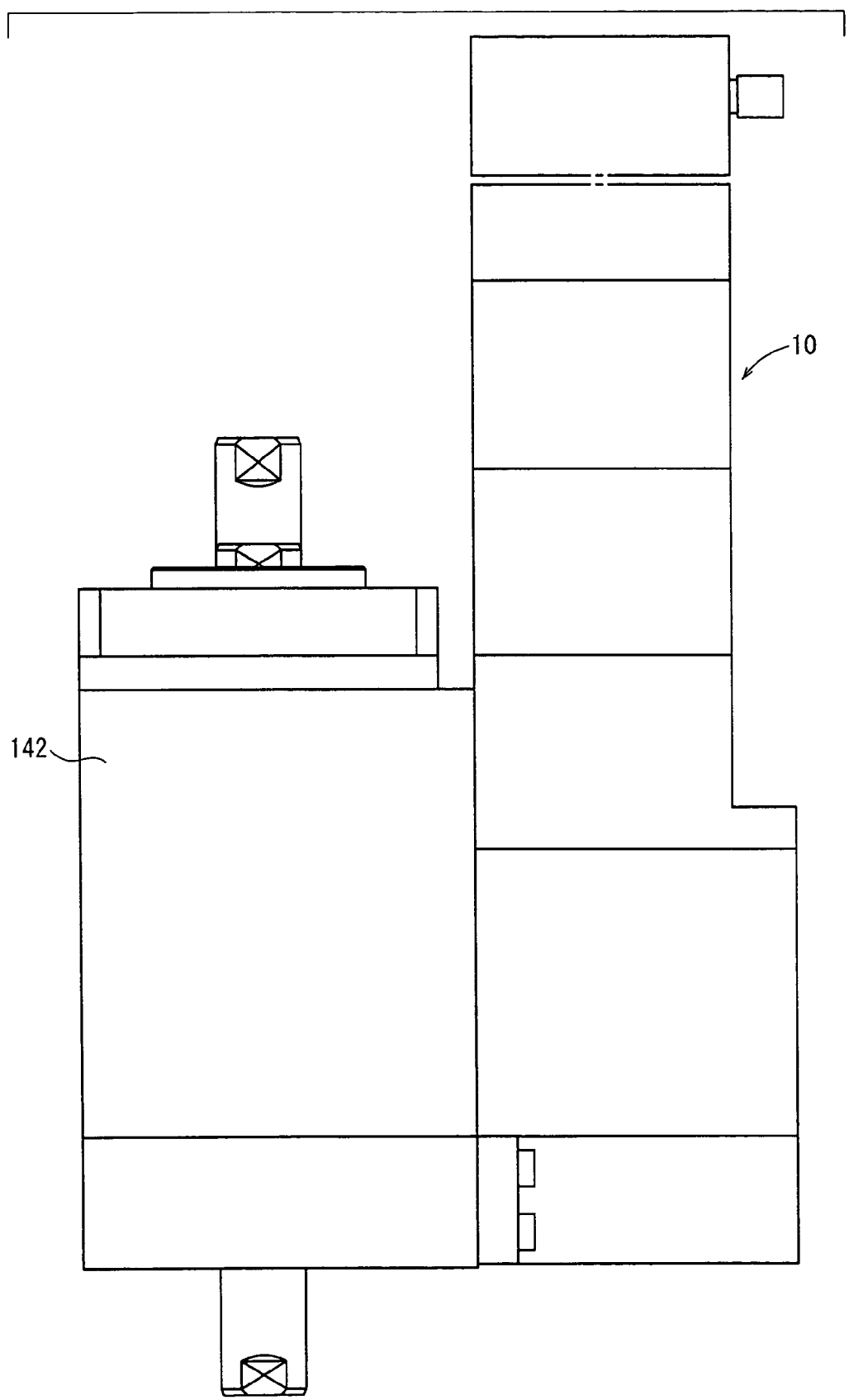
FIG. 19 is, with partial cutaway, a side view illustrating a state in which a hydraulic cylinder is juxtaposed.

Further, the present invention can also be applied to structures wherein an electric motor 72 is juxtaposed with a feed screw shaft 78 as in an electric clamp apparatus (see, for example, Japanese Laid-Open Patent Publication Nos. 2001-105332 and 2002-219625) as shown in FIGS. 17 and 18, and an apparatus is juxtaposed with a hydraulic cylinder 142 (see, for example, Japanese Laid-Open Patent Publication No. 2005-54862) (see FIG. 19).

Figure 20:
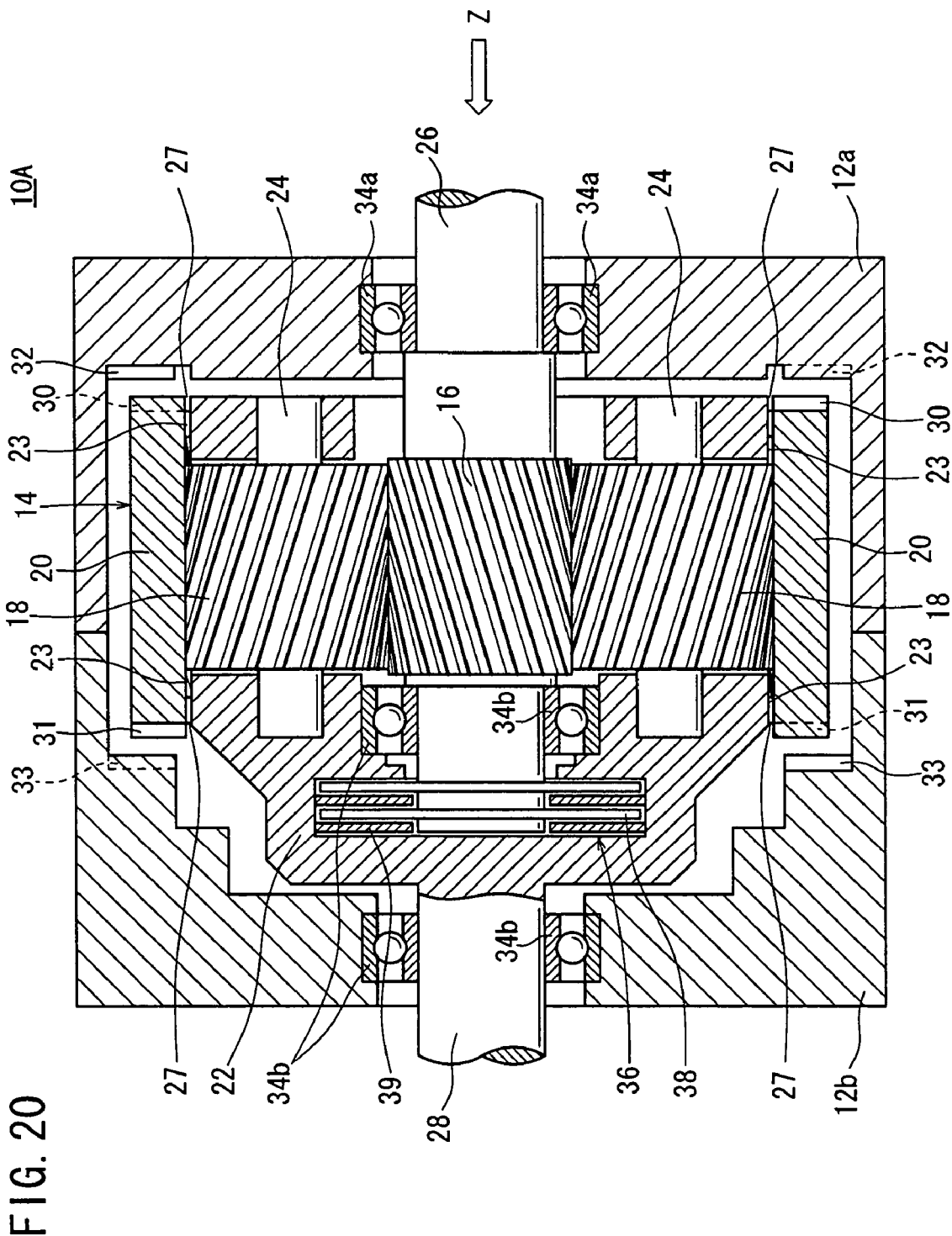
FIG. 20 is a longitudinal sectional view illustrating a viscous coupling section provided for the automatic speed reducing ratio-switching apparatus shown in FIG. 1 according to a second embodiment of the present invention.

A viscous coupling section 36, which functions as an internal resistance, may be provided between the output shaft 28 and the carrier 22 in order to efficiently transmit the rotation speed and the torque to the output shaft 28 even when the number of rotations of the output shaft 28 is smaller than the number of rotations of the input shaft 26, and the difference between the number of rotations of the input shaft 26 and the number of rotations of the output shaft 28 becomes large in the automatic speed reducing ratio-switching apparatus 10 according to the first embodiment. This arrangement is shown in FIG. 20 as an automatic speed reducing ratio-switching apparatus 10A according to a second embodiment. In the second embodiment, the viscous coupling section 36 is provided on the side of the carrier 22. The viscous coupling section 36 includes a plurality of disks 38 which have central holes and which are stacked while being separated from each other by predetermined spacing distances on the output shaft 28. Disks 39, which are provided integrally with the carrier 22, are interposed between the plurality of disks 38 which are separated from each other. For example, oil or grease having a high viscosity is filled between the plurality of disks 38, 39.

Figure 21:
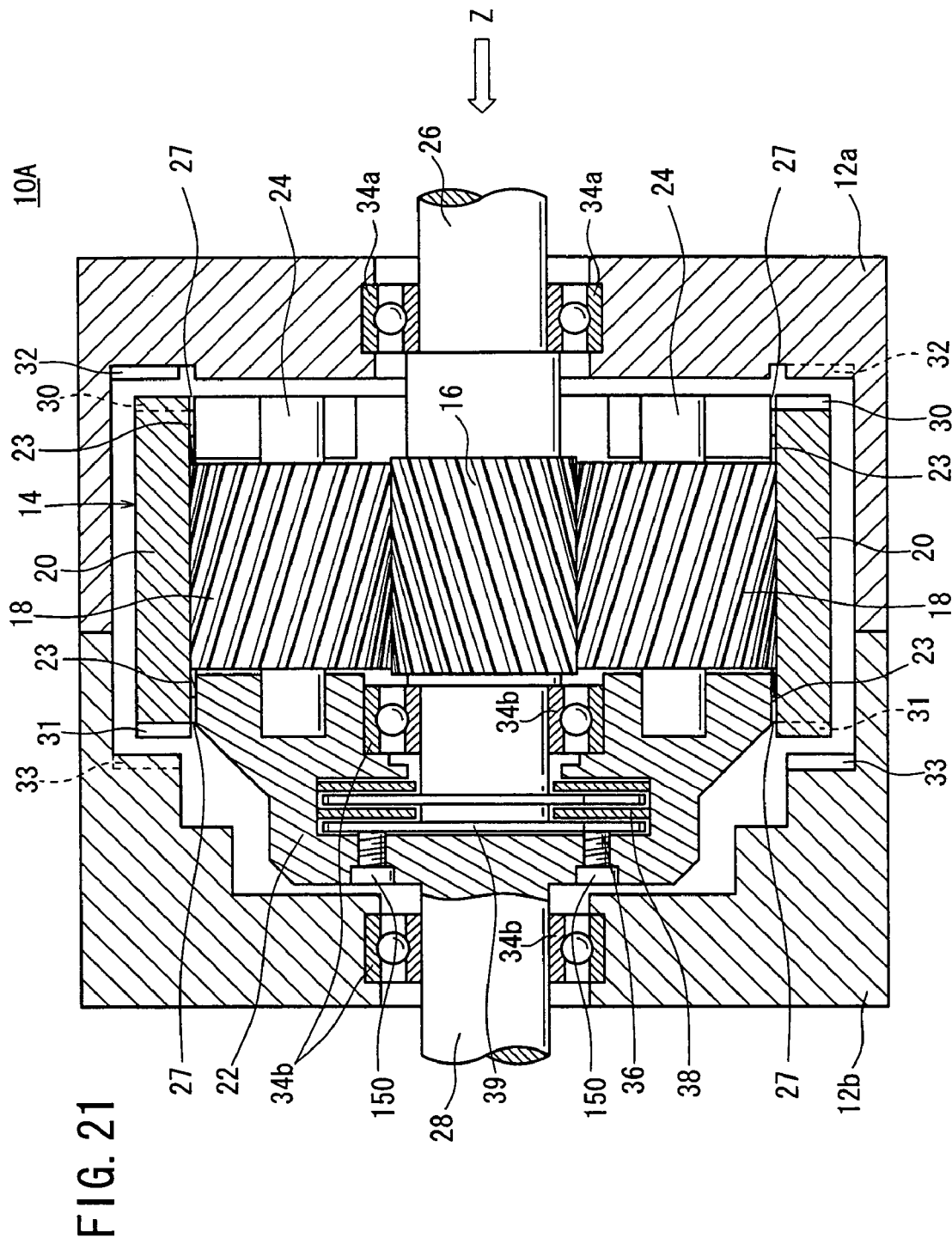
FIG. 21 is a longitudinal sectional view illustrating a modified embodiment of the automatic speed reducing ratio-switching apparatus shown in FIG. 20.

As shown in FIG. 21, one disk 39, which is disposed on the side of the output shaft 28, may be pressed by screwing adjusting screws 150. Accordingly, the fluid resistance can be increased or decreased in order to adjust the rotational force of the rotary driving source.

Figure 22A:
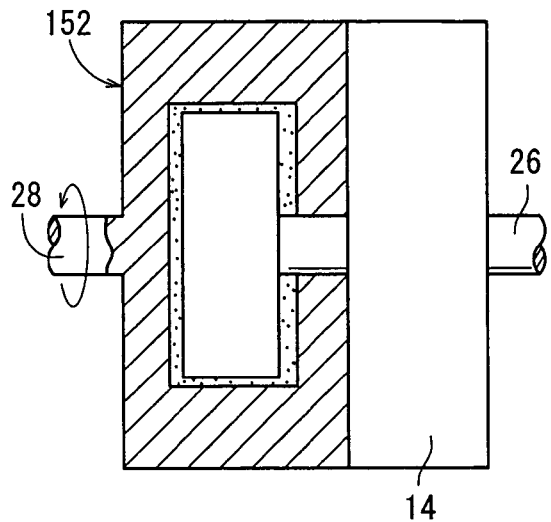
FIGS. 22A to 22D are respective longitudinal sectional views illustrating states in which various mechanisms are provided between the input shaft and the output shaft in the automatic speed reducing ratio-switching apparatus shown in FIG. 1.
Figure 22B:
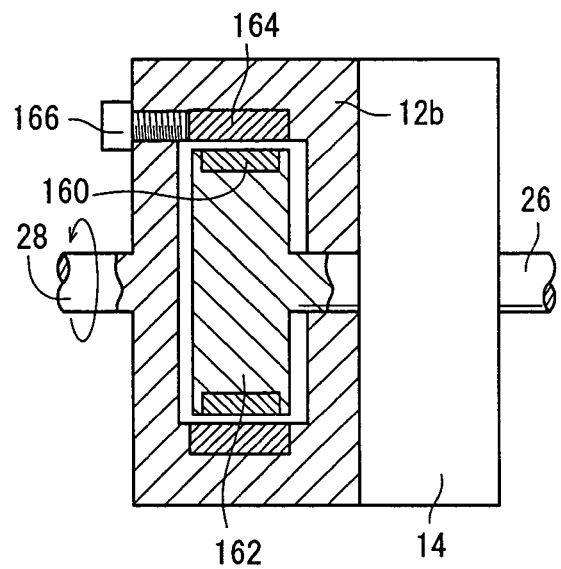
Figure 22C:
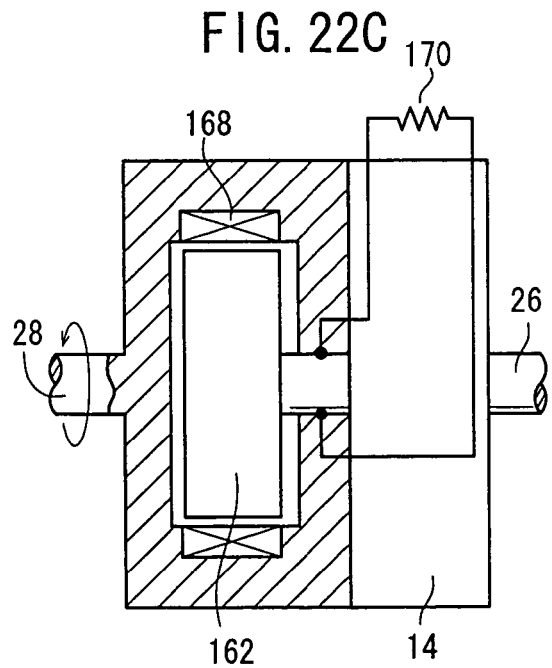
Figure 22D:
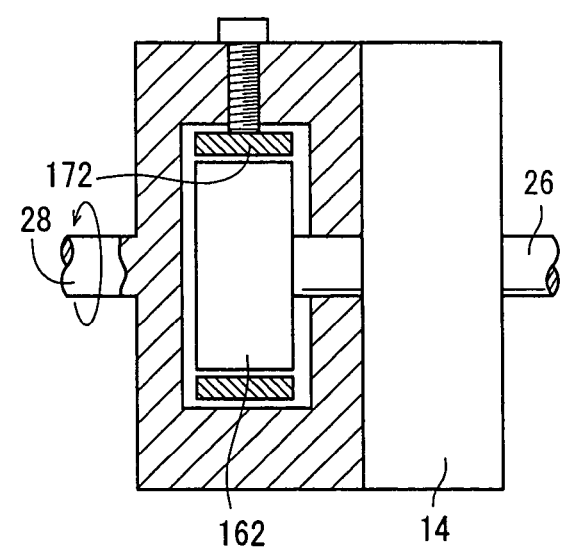
Figure 28:
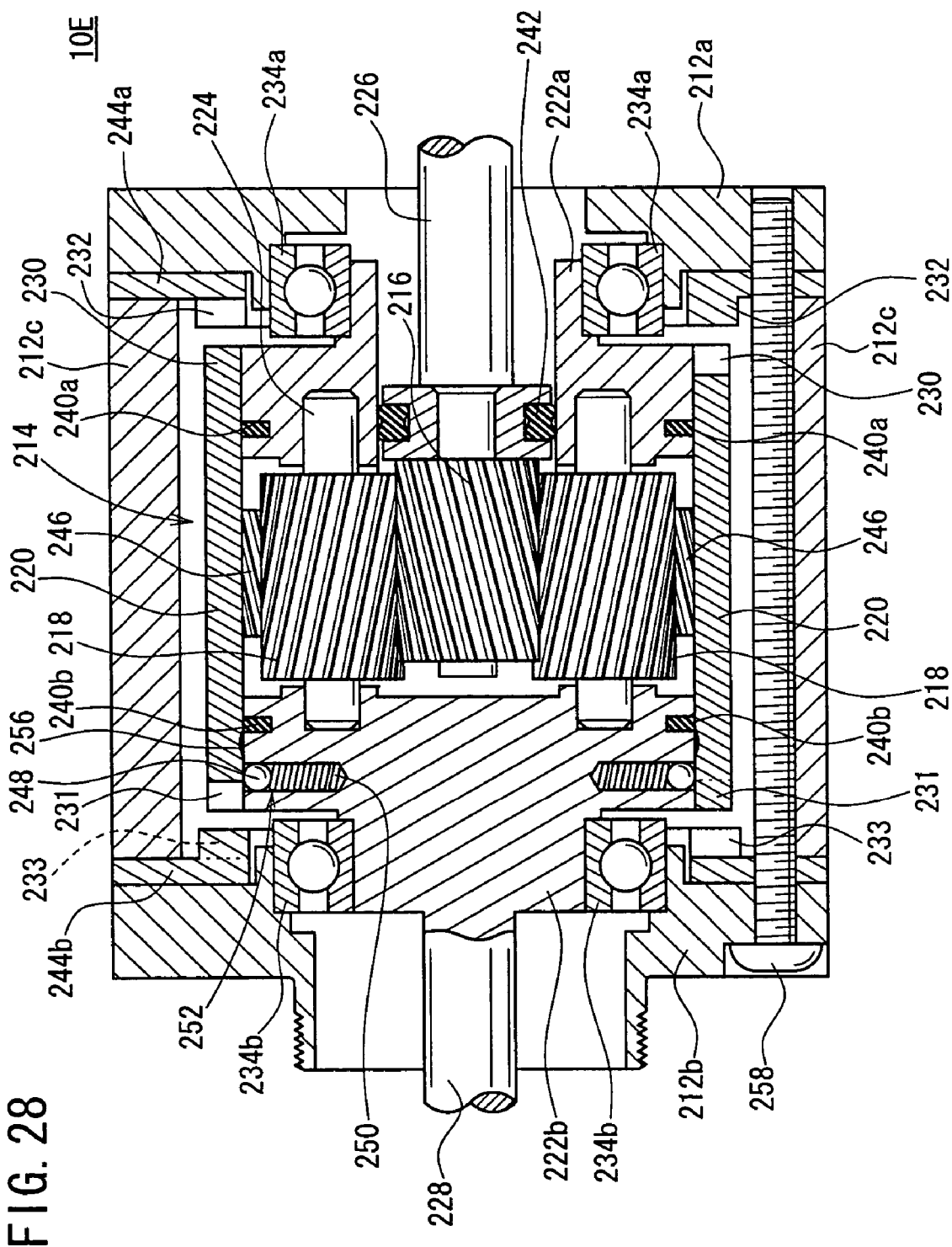
FIG. 28 is a longitudinal sectional view illustrating the automatic speed reducing ratio-switching apparatus according to the sixth embodiment of the present invention.

A powder clutch 152 may be interposed between the input shaft 26 and the output shaft 28 in order to efficiently transmit the rotation speed and the torque from the input shaft 26 to the output shaft 28 (see FIG. 28A). Alternatively, a magnet 160 may be provided for a rotor 162 between the input shaft 26 and the output shaft 28. A plate member 164 of aluminum or copper is attached to the inside of the housing 12b. The plate member 164 may be allowed to make forward and backward movement by using an adjusting screw 166 to change the magnetic flux of the magnet 160 so that the rotation resistance is variable (see FIG. 22B). Further alternatively, a coil 168 may be attached around the rotor 162. The resistance of a resistor 170 may be changed with respect to the coil 168 to control the rotation of the rotor 162 (see FIG. 22C). Further alternatively, the rotor 162 may be simply tightened with a brake 172 to affect the ON/OFF control for the rotation of the rotor 162 (see FIG. 22D).

Figure 23:
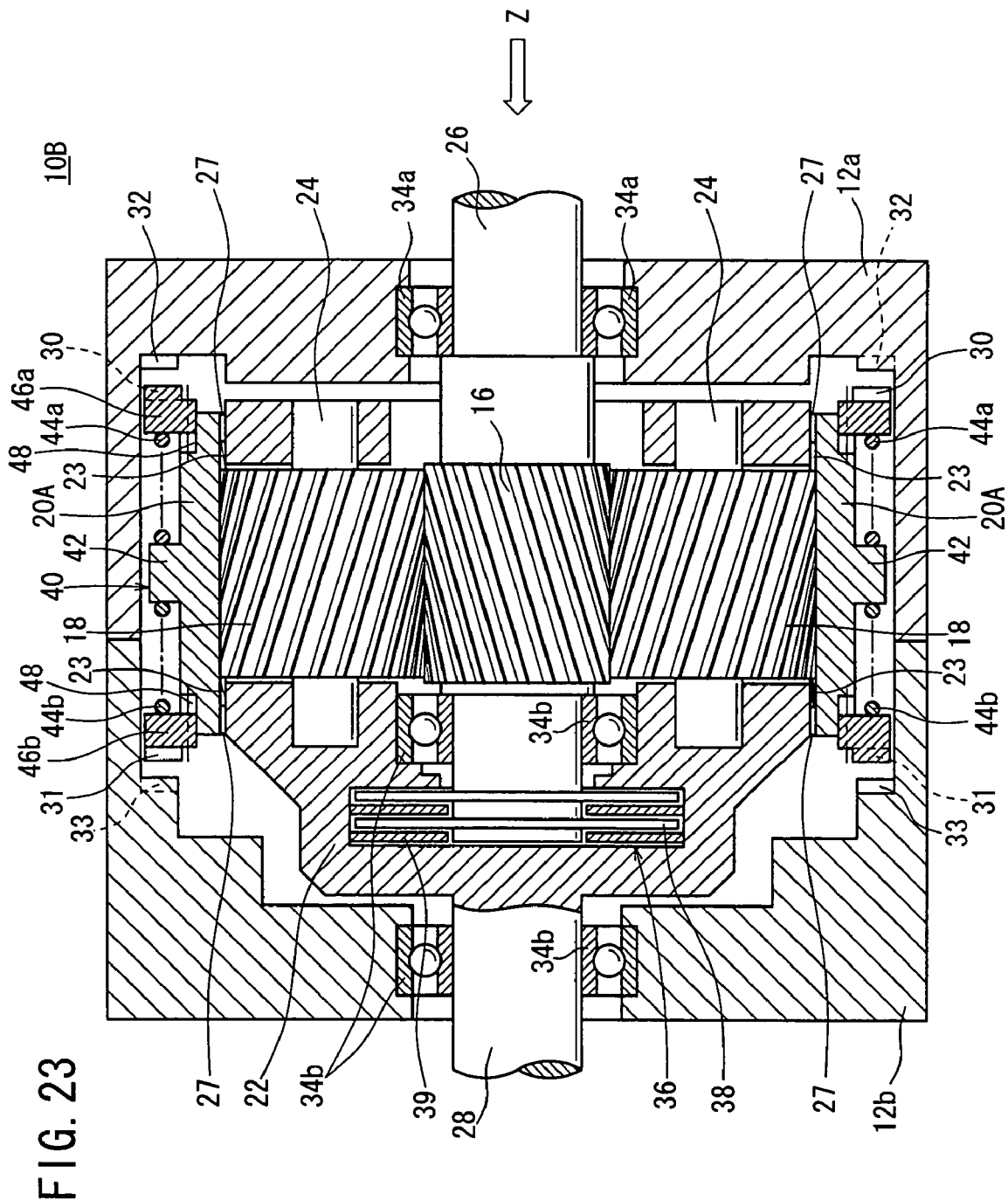
FIG. 23 is a longitudinal sectional view illustrating an automatic speed reducing ratio-switching apparatus according to a third embodiment of the present invention.

Next, an automatic speed reducing ratio-switching apparatus 10B according to a third embodiment of the present invention is shown in FIG. 23. In the automatic speed reducing ratio-switching apparatus 10B according to the third embodiment, an internal gear lock release mechanism 40 is provided on the outer circumferential end surface of an internal gear 20A as compared with the automatic speed reducing ratio-switching apparatus 10A according to the second embodiment.

Figure 24:
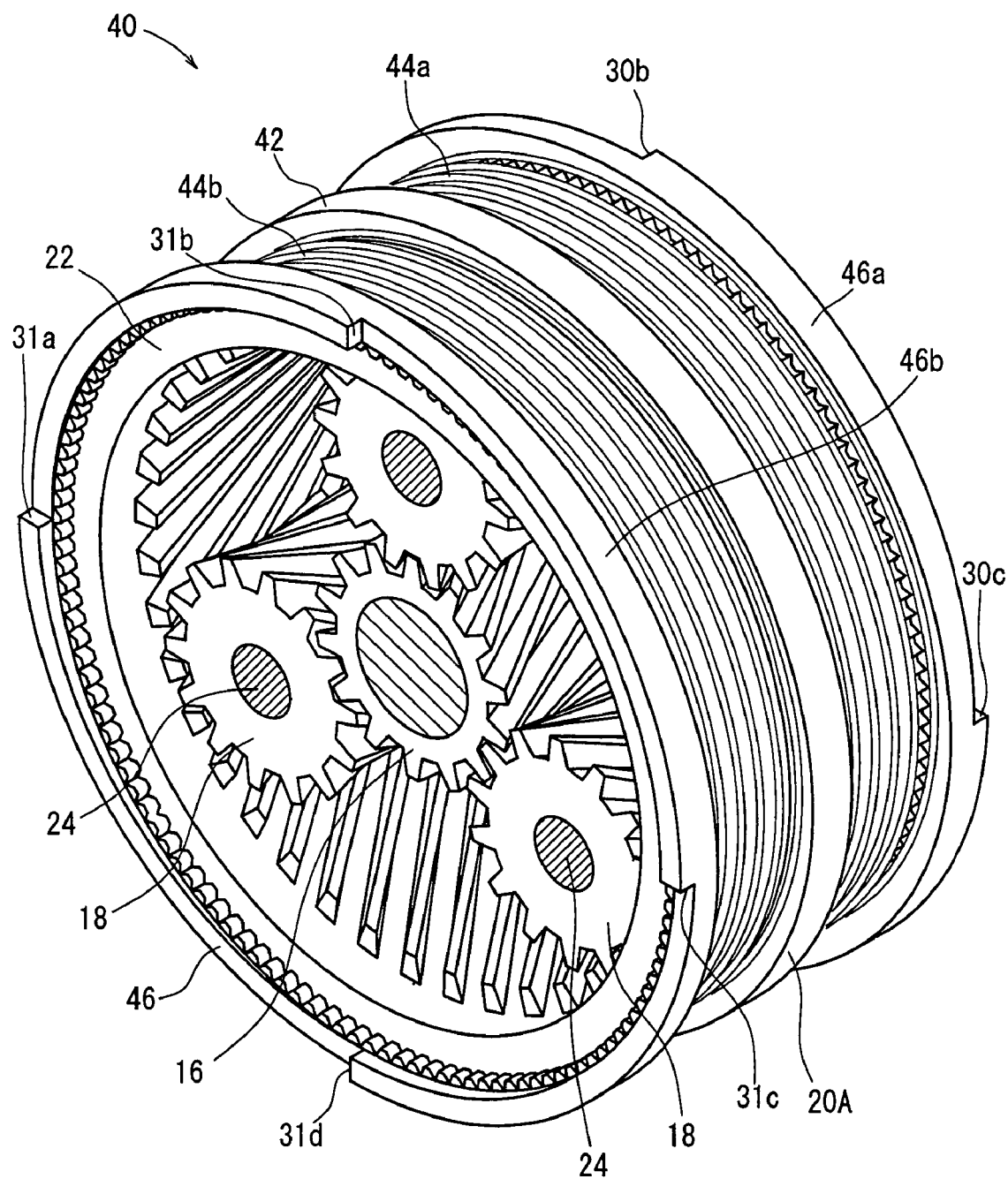
FIG. 24 is a perspective view illustrating an internal gear lock release mechanism.

As also shown in FIG. 24, the internal gear lock release mechanism 40 comprises a spring attachment section 42, springs 44a, 44b, and internal gear lock receiving sections 30a to 30d, 31a to 31d. Grooves are formed on the outer circumferential surface of the internal gear 20A while interposing the spring attachment section 42 which is provided annularly at a substantially central position in the axial direction. The springs 44a, 44b are wound helically around the grooves. Further, a first annular member 46a and a second annular member 46b, which are formed separately from the internal gear 20A and which have the internal gear lock receiving sections 30a to 30d, 31a to 31d respectively, are provided at the both circumferential edges of the cylindrical shape of the internal gear 20A so that they are capable of making parallel displacement in the direction toward the input shaft 26 or the direction toward the output shaft 28 along annular engaging grooves 48 of the internal gear 20A. When the internal gear 20A makes the parallel displacement in the direction toward the input shaft 26 or the direction toward the output shaft 28, then the springs 44a, 44b are interposed between the first annular member 46a (or the second annular member 46b) and the spring attachment section 42 of the internal gear 20A, and the internal gear lock receiving sections 31a to 31d (30a to 30d) are engaged with the lock sections 33a to 33d (32a to 32d) to constitute the locked state. After that, the pressing action is effected in the direction opposite to the direction of the parallel displacement by the elastic force of the springs 44a, 44b, and the locked state is quickly released. In this embodiment, the springs 44a, 44b are used. However, there is no limitation to the spring members provided that elastic members are used. For example, it is also possible to use rubber or the like. A magnet may be used as the internal gear lock release mechanism 40 in order to secure the function equivalent to that of the elastic force of the elastic member.

Accordingly, the automatic speed reducing ratio-switching apparatus 10B according to the third embodiment may be incorporated into the pressing apparatus 70 shown in FIGS. 15A to 15C. Starting from the state shown in FIG. 15B, when the pressing section 86 is displaced by a predetermined distance toward the workpiece W to make abutment against the workpiece W, and the load, which exceeds the preset torque, is applied from the pressing apparatus 70 via the output shaft 28 to the carrier 22, then the planet gears 18a, 18b, 18c make rotation in the counterclockwise direction which is opposite to the direction of the sun gear 16 without making revolution in accordance with the rotation of the sun gear 16, and the internal gear 20A, which is meshed with the planet gears 18, is rotated in the counterclockwise direction (see FIG. 7). As a result, the thrust force acts on the internal gear 20A, and the internal gear 20A makes parallel displacement in the Z1 direction.

The internal gear 20A makes the parallel displacement in the Z1 direction, the internal gear lock receiving sections 31 are meshed with the lock sections 33, and the internal gear 20A is in the locked state as shown in FIG. 8. When the internal gear 20A is in the locked state, the planet gears 18 make revolution in the clockwise direction together with the carrier 22 while making rotation in the counterclockwise direction in accordance with the rotation of the sun gear 16 (see FIG. 9). The increased torque is transmitted via the output shaft 28 to the pressing section 86 of the pressing apparatus 70. Accordingly, the workpiece W is pressed by the pressing section 86 (see FIG. 15C).

Subsequently, the polarity of the current supplied to the electric motor 72 is reversed after pressing the workpiece W by the pressing section 86. Accordingly, the sun gear 16 is rotated in the counterclockwise direction by the aid of the input shaft 26. The planet gears 18 make revolution in the counterclockwise direction together with the carrier 22 while making rotation in the clockwise direction in accordance with the rotation of the sun gear 16 (see FIG. 10). As a result, the thrust force acts on the internal gear 20A. The internal gear 20A makes parallel displacement in the direction opposite to the Z1 direction while making rotation in the clockwise direction. The internal gear lock receiving sections 31 of the internal gear 20A are separated from the lock sections 33 of the housing 12b, and the internal gear 20A is released from the locked state.

According to the automatic speed reducing ratio-switching apparatus 10B concerning the third embodiment, the internal gear lock receiving sections 30, 31 and the lock sections 32, 33 can be quickly released from the locked state by providing the internal gear lock release mechanism 40 for the internal gear 20A.

Figure 25:
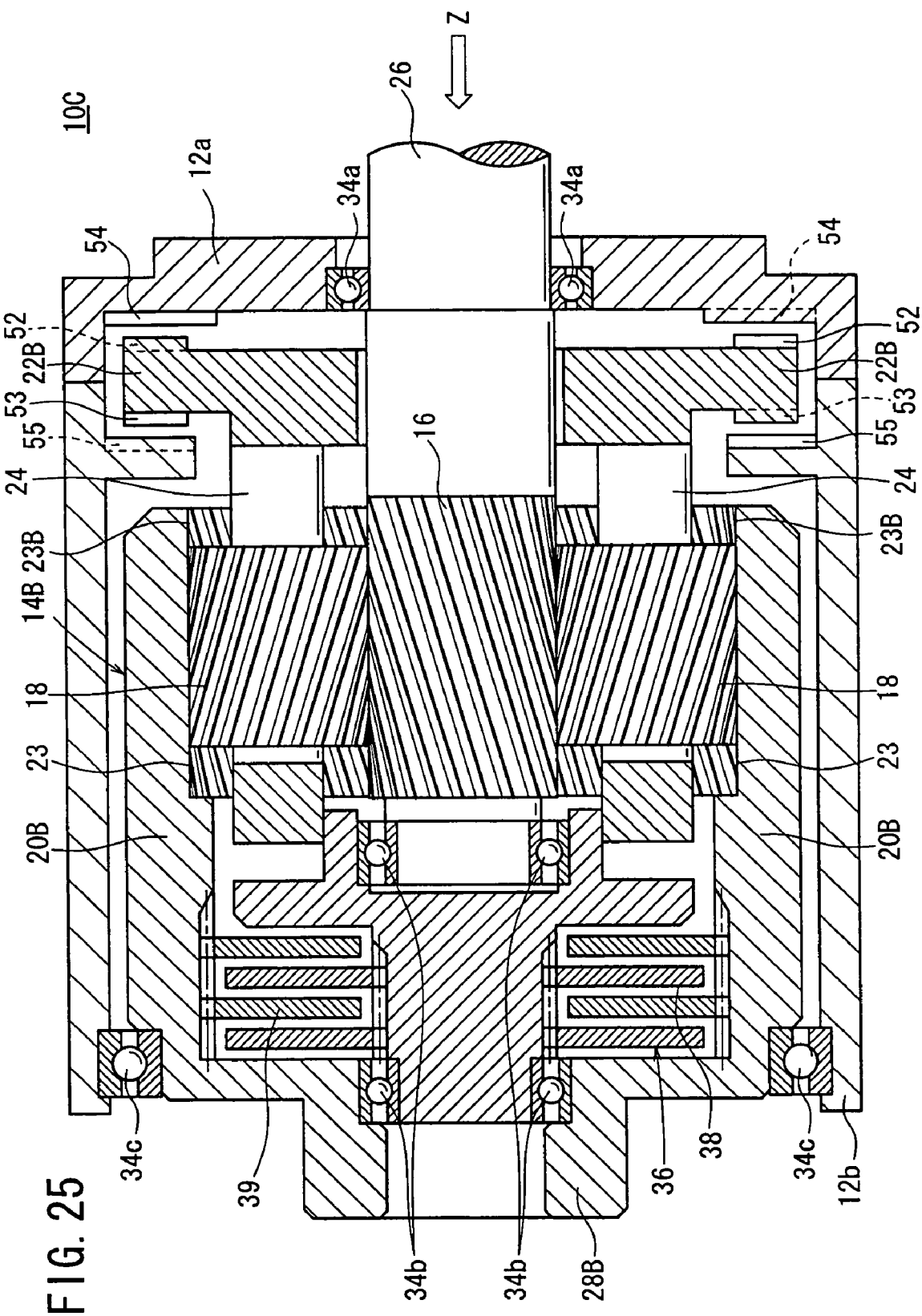
FIG. 25 is a longitudinal sectional view illustrating an automatic speed reducing ratio-switching apparatus according to a fourth embodiment of the present invention.

Next, FIG. 25 shows an automatic speed reducing ratio-switching apparatus 10C according to a fourth embodiment of the present invention. The automatic speed reducing ratio-switching apparatus 10C comprises housings 12a, 12b and a planetary gear mechanism 14B. The planetary gear mechanism 14B is accommodated in the housings 12a, 12b which are assembled in an integrated manner.

Lock sections 54 having projecting shapes, which are engageable with carrier lock receiving sections 52 as described later on when a carrier 22B makes parallel displacement in the direction toward the input shaft 26, are formed for the housing 12a therein. Lock sections 55 having projecting shapes, which are engageable with carrier lock receiving sections 53 as described later on when the carrier 22B makes parallel displacement in the direction toward the output shaft 28B, are formed for the housing 12b therein. The lock sections 54, 55 have projecting shapes to depict curves in the circumferential direction. A bearing section 34c is provided in order to rotatably support an internal gear 20B.

The planetary gear mechanism 14B comprises the sun gear 16 which is formed integrally with the input shaft 26, the planet gears 18a, 18b, 18c which are meshed with the sun gear 16 while being separated from each other by angles of about 120 degrees in the circumferential direction of the sun gear 16 to make revolution and rotation, the internal gear 20B, and the carrier 22B. The carrier 22B has a cylindrical inner section 23B which has a large diameter, and the input shaft 26 which protrudes in the same direction as that of the inner section 23B. The small diameter sun gear 16 is inserted into the inner section 23B, and the planet gears 18*a*, 18*b*, 18*c* face the windows 21 provided for the carrier 22B. The large diameter internal gear 20B, which is integrally provided with the output shaft 28B, is provided on the outer circumferential side of the planet gears 18*a*, 18*b*, 18*c*. The planet gears 18*a*, 18*b*, 18*c* are also meshed with the inner teeth engraved on the inner circumference of the internal gear 20B.

A plurality of carrier lock receiving sections 52, 53, each of which protrudes toward the end of the cylindrical shape of the internal gear 20B, are formed for the carrier 22B. The carrier lock receiving sections 52, 53 have projecting shapes to depict curves in the circumferential direction corresponding to the lock sections 54, 55. The carrier lock receiving sections 52, 53 and the lock sections 54, 55 function as the carrier lock mechanism.

Next, the operation of the automatic speed reducing ratio-switching apparatus 10C will be explained. The electric motor 72 is driven, and the rotational force of the electric motor 72 at the low load rotates the sun gear 16. As a result, the planet gears 18, the internal gear 20B, and the carrier 22B integrally make revolution in the clockwise direction around the sun gear 16 (see FIG. 6). As a result, the number of rotations, which corresponds to the number of rotations of the input shaft 26, is transmitted to the output shaft 28 to make rotation at a high speed. The feed screw shaft 78 is rotated via the fixed speed reducing ratio speed reducing unit 76 by the output shaft 28B. The feed nut of the movable member 80, which has the screw groove, is moved in the axial direction of the feed screw shaft 78 while being guided by the guide 84. Accordingly, the pressing section 86 is displaced from the initial position shown in FIG. 15A at a high speed in the direction approaching the workpiece W (see FIG. 15B).

Figure 7:
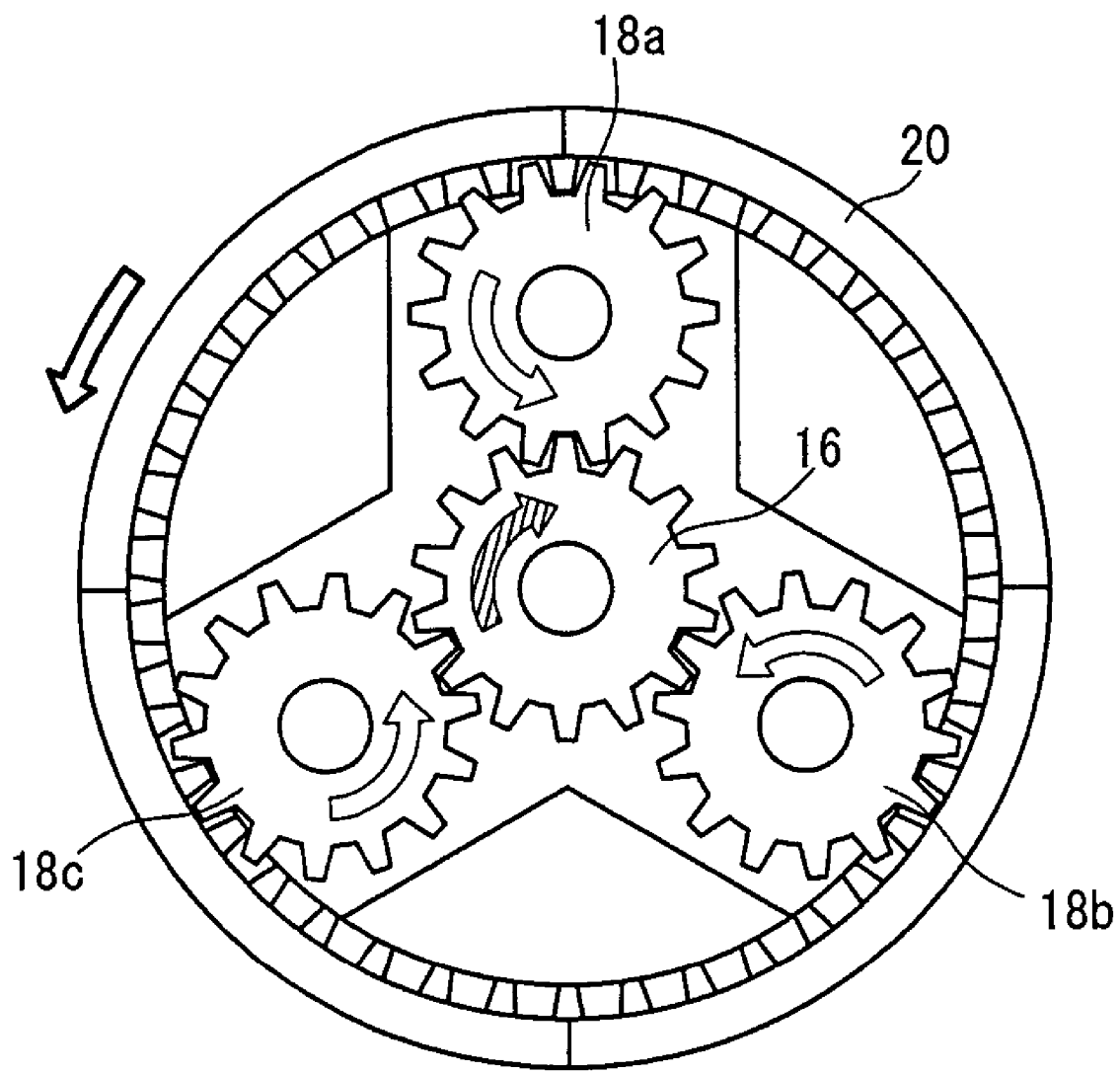
FIG. 7 is a side view illustrating the sun gear, the planet gears, and the internal gear when a load, which exceeds a preset torque, is applied to a carrier.
Figure 8:
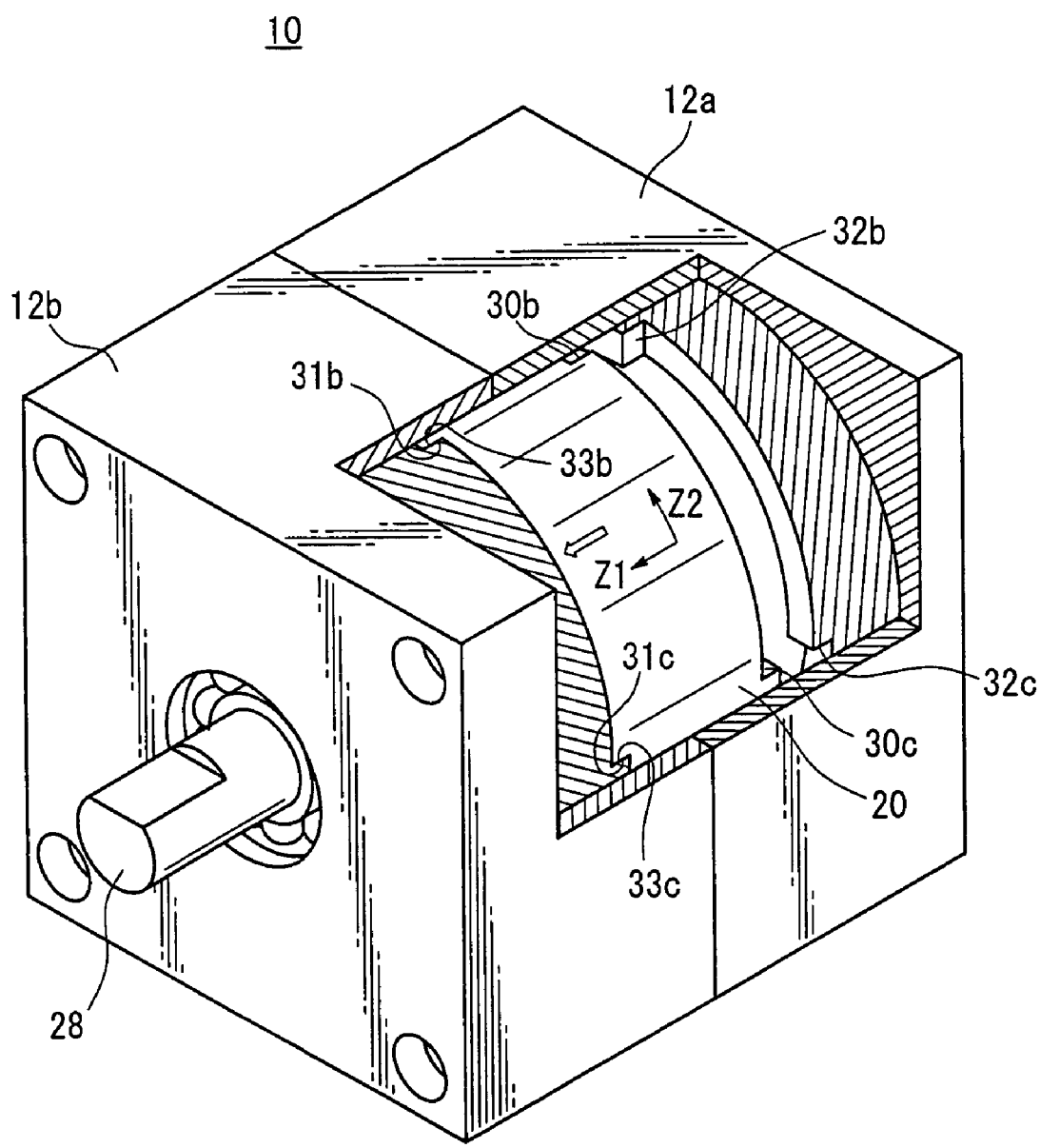
FIG. 8 is, with partial cutout, a perspective view illustrating a locked state of the automatic speed reducing ratio-switching apparatus according to the first embodiment of the present invention.

As shown in FIG. 15C, when the pressing section 86 abuts against the workpiece W, and the load, which exceeds the preset torque, is applied from the pressing apparatus 70 via the output shaft 28B to the internal gear 20B, then the planet gears 18*a*, 18*b*, 18*c* make rotation in the counterclockwise direction which is opposite to the direction of the sun gear 16 while the planet gears 18*a*, 18*b*, 18*c* do not make revolution as the sun gear 16 is rotated, and the internal gear 20B, which is meshed with the planet gears 18*a*, 18*b*, 18*c*, is rotated in the counterclockwise direction (see FIG. 7). As a result, the thrust force acts on the carrier 22B, and the carrier 22B makes parallel displacement in the Z direction.

The carrier 22B makes the parallel displacement in the Z direction, the carrier lock receiving sections 53 are meshed with the lock sections 55, and constitute the locked state. When the carrier 22B is in the locked state, the planet gears 18*a*, 18*b*, 18*c* make revolution together with the carrier 22B while making rotation in the counterclockwise direction in accordance with the rotation of the sun gear 16 (see FIG. 9). The increased torque is transmitted via the output shaft 28B to the pressing section 86 of the pressing apparatus 70, and thus the workpiece W is pressed by the pressing section 86 (see FIG. 15C).

Subsequently, when the polarity of the current supplied to the electric motor 72 is reversed after pressing the workpiece W by the pressing section 86, the sun gear 16 is rotated in the counterclockwise direction via the input shaft 26. As the sun gear 16 is rotated, the planet gears 18*a*, 18*b*, 18*c* make revolution in the counterclockwise direction together with the carrier 22B while making rotation in the clockwise direction (see FIG. 10). As a result, the thrust force acts on the carrier 22B. The carrier 22B makes parallel displacement in the direction opposite to the Z direction while making rotation in the clockwise direction. The carrier lock receiving sections 53 of the carrier 22B are separated from the lock sections 55, and the carrier 22B is released from the locked state.

When the carrier 22B is released from the locked state, the planet gears 18*a*, 18*b*, 18*c*, the internal gear 20B, and the carrier 22B again make revolution integrally in the counterclockwise direction around the sun gear 16 in conformity with the rotation of the sun gear 16 in the counterclockwise direction (see FIG. 11). As a result, the rotation speed, which corresponds to that of the input shaft 26, is directly transmitted to the output shaft 28B to cause the high speed rotation. The pressing section 86 is moved at a high speed while being guided by the guide 84 in the direction to make separation from the workpiece W to successfully return to the initial position shown in FIG. 15A.

According to the automatic speed reducing ratio-switching apparatus 10C of the fourth embodiment, when the load, which exceeds the preset torque, is applied from the actuator via the output shaft 28B to the internal gear 20B, the planet gears 18*a*, 18*b*, 18*c* and the carrier 22B, which have been rotated in the same direction of rotation as that of the sun gear 16, are rotated in the direction different from that of the sun gear 16. Accordingly, the carrier lock receiving sections 52, 53 are meshed with the lock sections 54, 55, and the rotation of the carrier 22B is stopped to lock the carrier 22B. When the carrier 22B is in the locked state, the speed reducing ratio, which is transmitted via the internal gear 20B, is automatically switched. The displacement member, which constitutes the actuator, is displaced at a high torque and a low speed in the vicinity of the terminal end position of the outward route. On the other hand, when the displacement member is displaced from the outward route to the returning route, then the polarity of the current of the rotary driving source is reversed, and the sun gear 16 is reversed to release the carrier 22B from the locked state. Therefore, the speed reducing ratio, which is transmitted from the output shaft 28B to the displacement member of the actuator, is automatically switched. The displacement member, which constitutes the actuator, can be displaced along the returning route at a low torque and a high speed.

Figure 26:
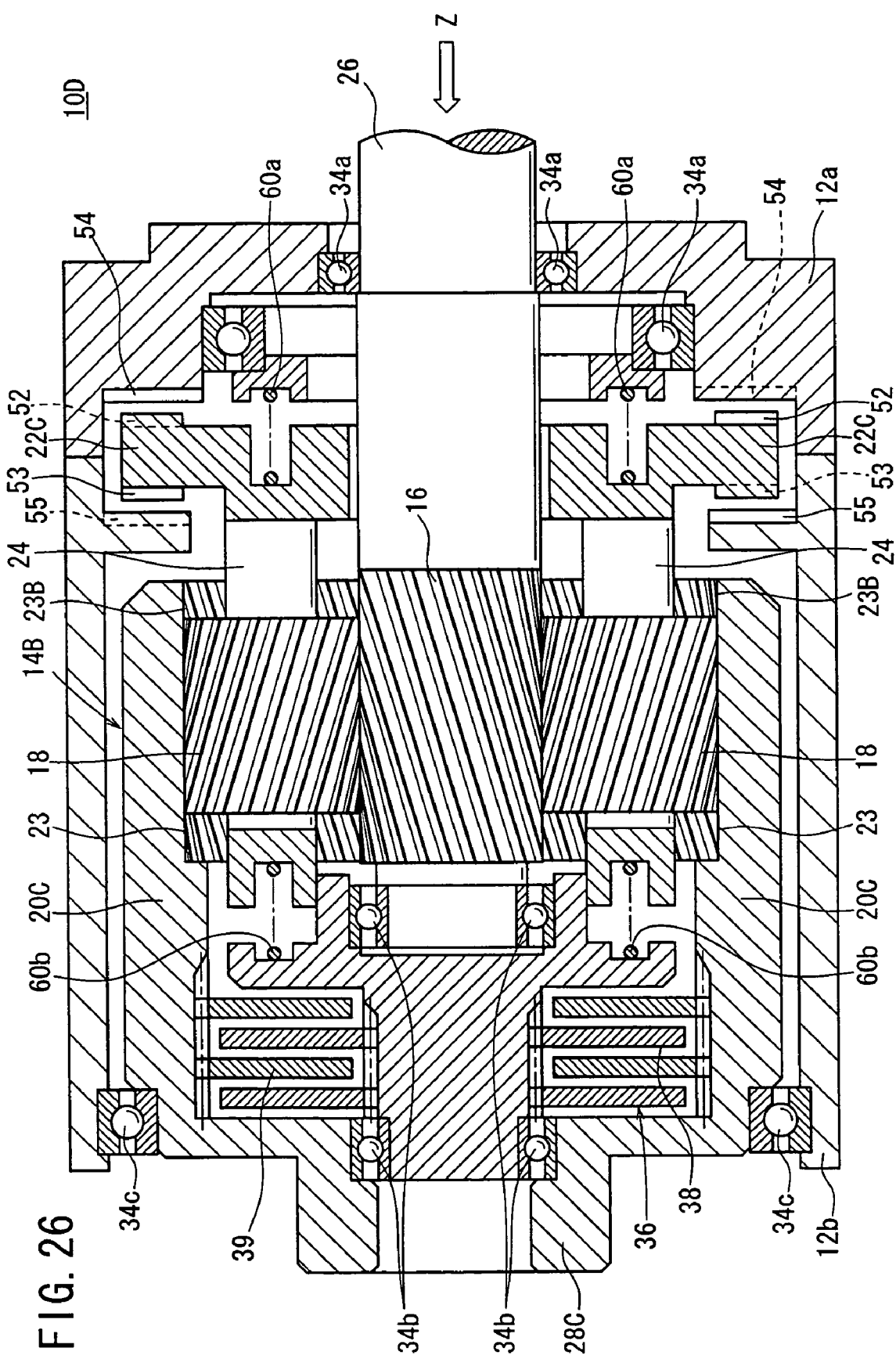
FIG. 26 is a longitudinal sectional view illustrating an automatic speed reducing ratio-switching apparatus according to a fifth embodiment of the present invention.

Next, FIG. 26 shows an automatic speed reducing ratio-switching apparatus 10D according to a fifth embodiment of the present invention. As shown in FIG. 26, in the automatic speed reducing ratio-switching apparatus 10D, annular grooves are provided at circumferential edge portions of a carrier 22C, and annular springs 60*a*, 60*b* are provided in the grooves as compared with the automatic speed reducing ratio-switching apparatus 10B according to the fourth embodiment.

Accordingly, when the automatic speed reducing ratio-switching apparatus 10D according to the fifth embodiment is incorporated into the pressing apparatus 70, the pressing section 86 is displaced by a predetermined distance toward the workpiece W in the state shown in FIG. 15B to make abutment against the workpiece W. When the load, which exceeds the preset torque, is applied from the pressing apparatus 70 via the output shaft 28C to the internal gear 20C, then the sun gear 16 is rotated, and thus the planet gears 18 make rotation in the counterclockwise direction which is opposite to the direction of the sun gear 16 without making revolution. The internal gear 20C, which is meshed with the planet gears 18*a*, 18*b*, 18*c*, is rotated in the counterclockwise direction (see FIG. 7). As a result, the thrust force acts on the carrier 22C, and the carrier 22C makes parallel displacement in the Z direction.

The carrier 22C makes the parallel displacement in the Z direction, the carrier lock receiving sections 53 are meshed with the lock sections 55, and the carrier 22C is in the locked state. When the carrier 22C is in the locked state, the planet gears 18a, 18b, 18c make revolution in the clockwise direction together with the carrier 22C while making rotation in the counterclockwise direction in accordance with the rotation of the sun gear 16 (see FIG. 9). The increased torque is transmitted via the output shaft 28C to the pressing section 86 of the pressing apparatus 70, and thus the workpiece W is pressed by the pressing section 86 (see FIG. 15C).

Subsequently, when the polarity of the current supplied to the electric motor 72 is reversed after the workpiece W is pressed by the pressing section 86, the sun gear 16 is rotated in the counterclockwise direction via the input shaft 26. As the sun gear 16 is rotated, the planet gears 18a, 18b, 18c make revolution in the counterclockwise direction together with the carrier 22C while making rotation in the clockwise direction (see FIG. 10). As a result, the thrust force acts on the carrier 22C. The carrier 22C makes parallel displacement in the direction opposite to the Z direction while making rotation in the clockwise direction. The carrier lock receiving sections 53 of the carrier 22C are separated from the lock sections 55, and the carrier 22C is released from the locked state. The carrier lock receiving sections 53 of the carrier 22C are separated from the lock sections 55 of the housing 12b, and the carrier 22C is released from the locked state. During this process, the carrier 22C is subjected to the parallel displacement in the direction opposite to the Z1 direction by the aid of the elastic force of the spring 60b. The carrier 22C is quickly released from the locked state.

According to the automatic speed reducing ratio-switching apparatus 10D of the fifth embodiment, the springs 60a, 60b are provided for the carrier 22C, and thus it is possible to quickly release the locked state of the carrier lock receiving sections 52, 53 and the lock sections 54, 55.

Figure 27:
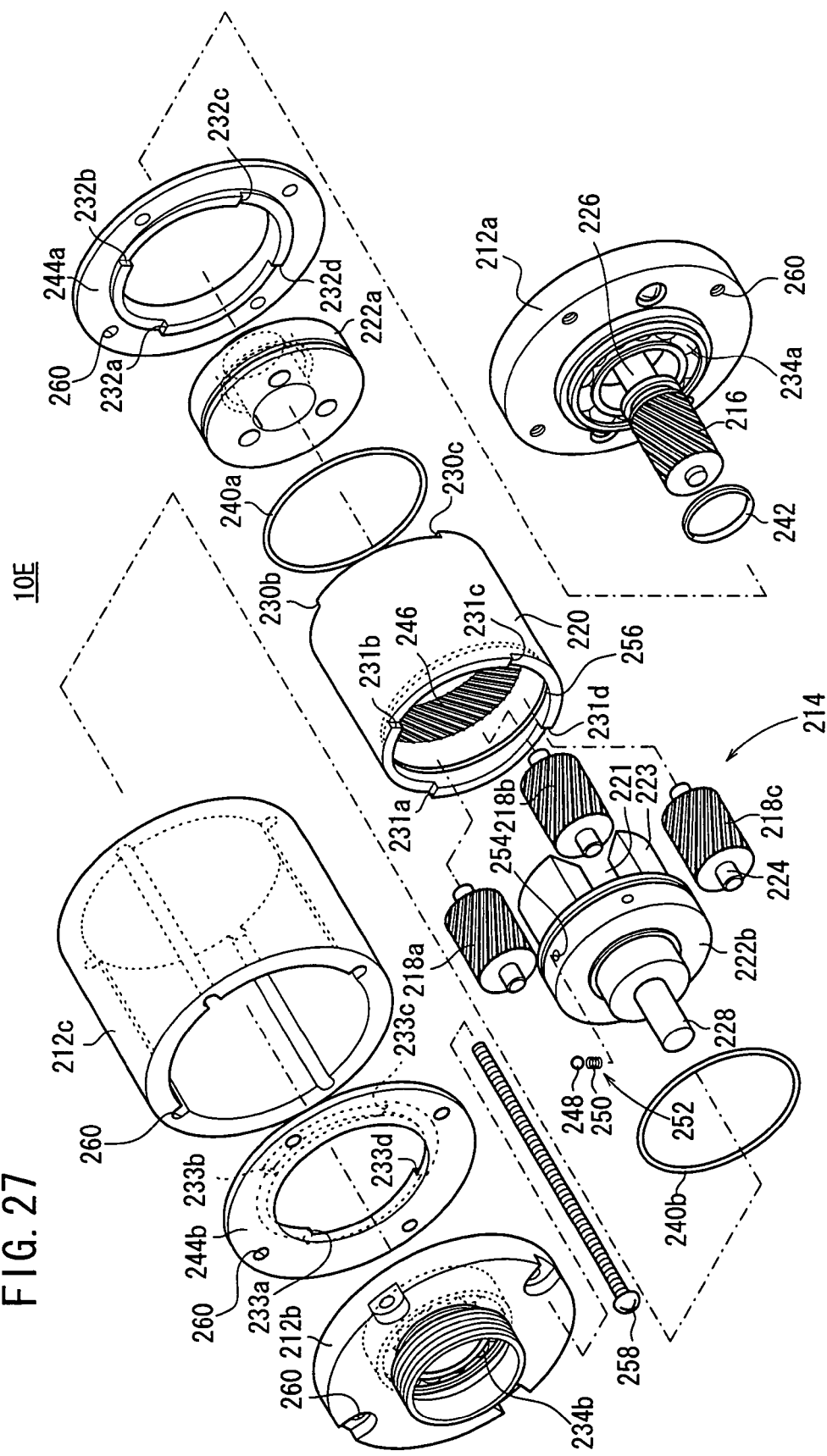
FIG. 27 is an exploded perspective view illustrating an automatic speed reducing ratio-switching apparatus according to a sixth embodiment of the present invention.

FIG. 27 shows an exploded perspective view illustrating an automatic speed reducing ratio-switching apparatus 10E according to a sixth embodiment. The automatic speed reducing ratio-switching apparatus 10E is different from the automatic speed reducing ratio-switching apparatus 10 according to the first embodiment in the following features. That is, the housings 12a, 12b are constructed with housings 212a, 212b, 212c. The carrier 22 is constructed with carriers 222a, 222b. Carrier rings 240a, 240b and an input shaft ring 242 are provided in a planetary gear mechanism 214. The lock sections 32a to 32d, which have been formed in the housing 12a, are provided as lock sections 232a to 232d on a lock plate 244a. The lock sections 33a to 33d, which have been formed in the housing 12b, are provided as lock sections 233a to 233d on a lock plate 244b.

The housing 212a is annular, which is provided with a bearing section 234a for rotatably supporting an input shaft 226. The housing 212b is annular in the same manner as the housing 212a, which is provided with a bearing section 234b for rotatably supporting an output shaft 228. The housing 212c is formed to be cylindrical.

The lock plate 244a is annular, which is provided with the lock sections 232a to 232d composed of circular arc-shaped projections so that the lock sections 232a to 232d are opposed to one another in order to make engagement with internal gear lock receiving sections 230a to 230d as described later on when the internal gear 220 makes parallel displacement in the direction toward the input shaft 226 as described later on.

The lock plate 244b is annular in the same manner as the lock plate 244a, which is provided with the lock sections 233a to 233d composed of circular arc-shaped projections so that the lock sections 233a to 233d are opposed to one another in order to make engagement with internal gear lock receiving sections 231a to 231d when the internal gear 220 makes parallel displacement in the direction toward the output shaft 228 as described later on.

The impact force is exerted upon the engagement between the internal gear lock receiving sections 230a to 230d and the lock sections 232a to 232d or between the internal gear lock receiving sections 230a to 230d and the lock sections 232a to 232d. The internal gear lock receiving sections 230 and the lock sections 232 tend to be abraded.

In order to avoid the abrasion, it is preferable that the contact areas are increased between the circular arc-shaped projections of the internal gear lock receiving sections 230 and the lock sections 232, or a large number of circular arc-shaped projections are provided for the internal gear lock receiving sections 230 and the lock sections 232.

A method, in which the mechanical strength is enhanced for the internal gear 220 and the lock plates 244a, 244b, may be also adopted as another method for preventing the abrasion. When the mechanical strength is enhanced, it is preferable that the Rockwell hardnesses (HRC) of the internal gear 220 and the lock plates 244a, 244b are not less than 50. A method, in which the internal gear 220 and the lock plates 244a, 244b are made of the same material to obtain the equivalent mechanical strength, may be adopted as still another method for avoiding the abrasion.

The material for the internal gear 220 and the lock plates 244a, 244b is not specifically limited provided that the same material is used. However, for example, polyacetal can be used to form the internal gear 220 and the lock plates 244a, 244b. When a resin-based material such as polyacetal is used, it is possible to lighted the self-weights of the internal gear 220 and the lock plates 244a, 244b. Therefore, it is possible to reduce the sound generated when the internal gear 220 and the lock plates 244a, 244b make contact with each other.

The planetary gear mechanism 214 comprises a sun gear 216 which is formed integrally with the input shaft 226, planet gears 218a, 218b, 218c which are meshed while being separated from each other by angles of about 120 degrees in the circumferential direction of the sun gear 216 to make revolution and rotation, the internal gear 220, the carriers 222a, 222b, the carrier rings 240a, 240b, and the input shaft ring 242.

The carrier 222b has an inner section 223 which is formed and divided into a plurality of pieces in the circumferential direction, and the output shaft 228 which protrudes from the inner section 223 to the housing 212b. The sun gear 216 is inserted into the inner section 223 facing the inner diameter portion thereof. The inner section 223 is formed with windows 221 which are separated from each other by equal angles of 120 degrees. The planet gears 218a, 218b, 218c are provided to face the windows 221. In this arrangement, the planet gears 218a, 218b, 218c are rotatably supported between one carrier 222a and the other carrier 222b by using pins 224.

The large diameter internal gear 220, which is cylindrical and which has inner teeth 246 engraved on the inner circumference, is fitted to the outer circumferential side of the planet gears 218a, 218b, 218c. The planet gears 218a, 218b, 218c are meshed with the inner teeth 246. A hole 254 is provided on the side circumferential surface of the carrier 222b in order to attach a fastening mechanism 252 which is composed of a steel ball 248 and a spring 250. An annular groove 256 is provided at a position on the inner circumferential surface of the internal gear 220 corresponding to the fastening mechanism 252.

For example, even when the driving operation is performed as an actuator at no load or low load, the deviation in the number of rotations occurs in some cases between the input shaft 26 and the output shaft 28. The internal gear 20 may undesirably be moved in the axial direction due to the deviation in the number of rotations. On the contrary, the automatic speed reducing ratio-switching apparatus 10E is provided with the fastening mechanism 252 which is operated such that even when the deviation in the number of rotations intends to occur between the input shaft 26 and the output shaft 28 by being driven at no load or low load, the internal gear 220 is prevented from being moved in the direction toward the input shaft 226 or the direction toward the output shaft 228 to avoid the deviation in the number of rotations between the input shaft 226 and the output shaft 228 at no load or low load.

Figure 29:
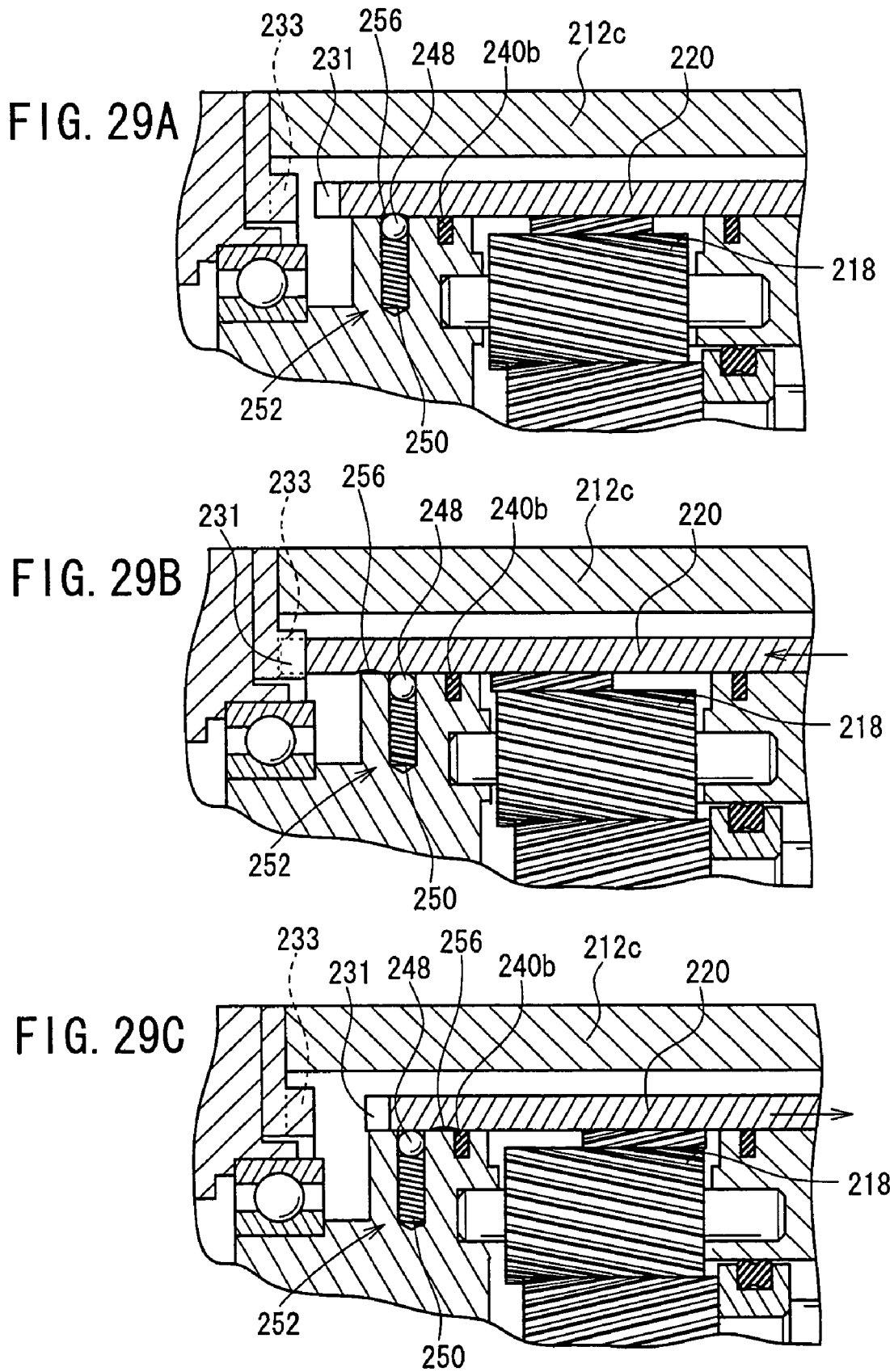
FIG. 29A is a partial magnified longitudinal sectional view illustrating a state in which an internal gear is retained by a fastening mechanism.
FIGS. 29B and 29C are respective partial magnified longitudinal sectional views illustrating states in which the internal gear is disengaged from the fastening mechanism and the internal gear is moved horizontally to the direction toward the output shaft or the direction toward the input shaft.

Therefore, when the fastening mechanism 252 is provided, the internal gear 220 is prevented from being moved in the direction toward the input shaft 226 or the direction toward the output shaft 228 (see FIG. 29A) to avoid the abutment between the internal gear 220 and the lock plates 258a, 258b at no load or low load. Thus, it is possible to avoid the generation of the abutment sound.

Paradoxically, if the fastening mechanism 252 is not provided, then the internal gear 220 is moved in the direction toward the input shaft 226 or the direction toward the output shaft 228 at no load or low load, the internal gear 220 and the lock plates 258a, 258b make abutment, and the abutment sound is generated. For example, when the internal gear 220 is moved in the direction toward the output shaft 228, then the abutment occurs without meshing the internal gear lock receiving section 231a and the lock section 233b of the lock plate 244b, and the abutment sound is generated, because the internal gear 220 is rotated in the clockwise direction as viewed from the side of the input shaft 226.

The sun gear 216, the planet gears 218a, 218b, 218c, and the internal gear 220 are composed of helical gears in the same manner as in the automatic speed reducing ratio-switching apparatus 10 according to the first embodiment. In this arrangement, for example, oil or grease having a high viscosity is filled or applied in order to obtain the viscous resistance between the planet gears 218a, 218b, 218c and the inner section 223 of the carrier 222b and between the planet gears 218a, 218b, 218c and the inner teeth 246. The carrier ring 240a is provided between the internal gear 220 and the carrier 222a in order to avoid any leakage of the oil, grease or the like from the internal gear 220. Further, the carrier ring 240b is provided between the internal gear 220 and the carrier 222b.

The pair of carrier rings 240a, 240b function as the first seal mechanism respectively, which are preferably formed of, for example, a rubber material such as NBR.

Further, the input shaft ring 242 is installed to an annular groove of the input shaft 226 in order to prevent the oil, grease or the like from any leakage toward the input shaft 226 from the sun gear 216 meshed with the planet gears 218a, 218b, 218c. The input shaft ring 242 functions as the second seal mechanism, which is preferably formed of, for example, a rubber material such as silicone rubber having the lubricant property.

The shapes of the carrier ring 240a, the carrier ring 240b, and the input shaft ring 242 are not specifically limited. However, it is preferable that the cross-sectional shapes of the carrier ring 240a and the carrier ring 240b are substantially elliptical. It is preferable that the cross-sectional shape of the input shaft ring 242 is substantially X-shaped.

A plurality of internal gear lock receiving sections 230a to 230d, 231a to 231d, which are curved in the circumferential direction respectively and each of which protrudes by a predetermined length in the axial direction, are formed at the both ends of the cylindrical shape of the internal gear 220. As shown in FIG. 27, the internal gear lock receiving sections 230a to 230d, 231a to 231d are formed in the curved form to have the shapes of projections in the circumferential direction corresponding to the lock sections 232a to 232d, 233a to 233d. The internal gear lock receiving sections 230a to 230d, 231a to 231d and the lock sections 232a to 232d, 233a to 233d function as the internal gear lock mechanism.

The housings 212a, 212b, 212c and the lock plates 244a, 244b are provided with assembling holes 260 respectively in order to insert screws 258 to assemble the input shaft 226, the internal gear 220, and the carriers 222a, 222b.

The automatic speed reducing ratio-switching apparatus 10E according to the sixth embodiment is basically operated in the same manner as the automatic speed reducing ratio-switching apparatus 10 according to the first embodiment. However, the automatic speed reducing ratio-switching apparatus 10E has the fastening mechanism 252 as compared with the automatic speed reducing ratio-switching apparatus 10. Therefore, when the driving operation is performed at no load or low load, the steel ball 248 of the fastening mechanism 252 is retained by being pressed toward the groove 256 of the internal gear 220 by the spring force of the spring 250. Accordingly, it is possible to avoid the movement of the internal gear 220 in the direction toward the output shaft 228 or the direction toward the input shaft 226 (see FIG. 29A).

When the load, which exceeds the preset torque, is applied to the output shaft 228, then the steel ball 248 overcomes the spring force of the spring 250, and the steel ball 248 is slightly displaced toward the spring 250. The steel ball 248 rides over the groove 256, the steel ball 248 is disengaged from the groove 256, and the steel ball 248 is released from the retained state. Accordingly, the internal gear 220 is moved in the direction toward the output shaft 228 or the direction toward the input shaft 226 (see FIGS. 29B and 29C).

Figure 30:
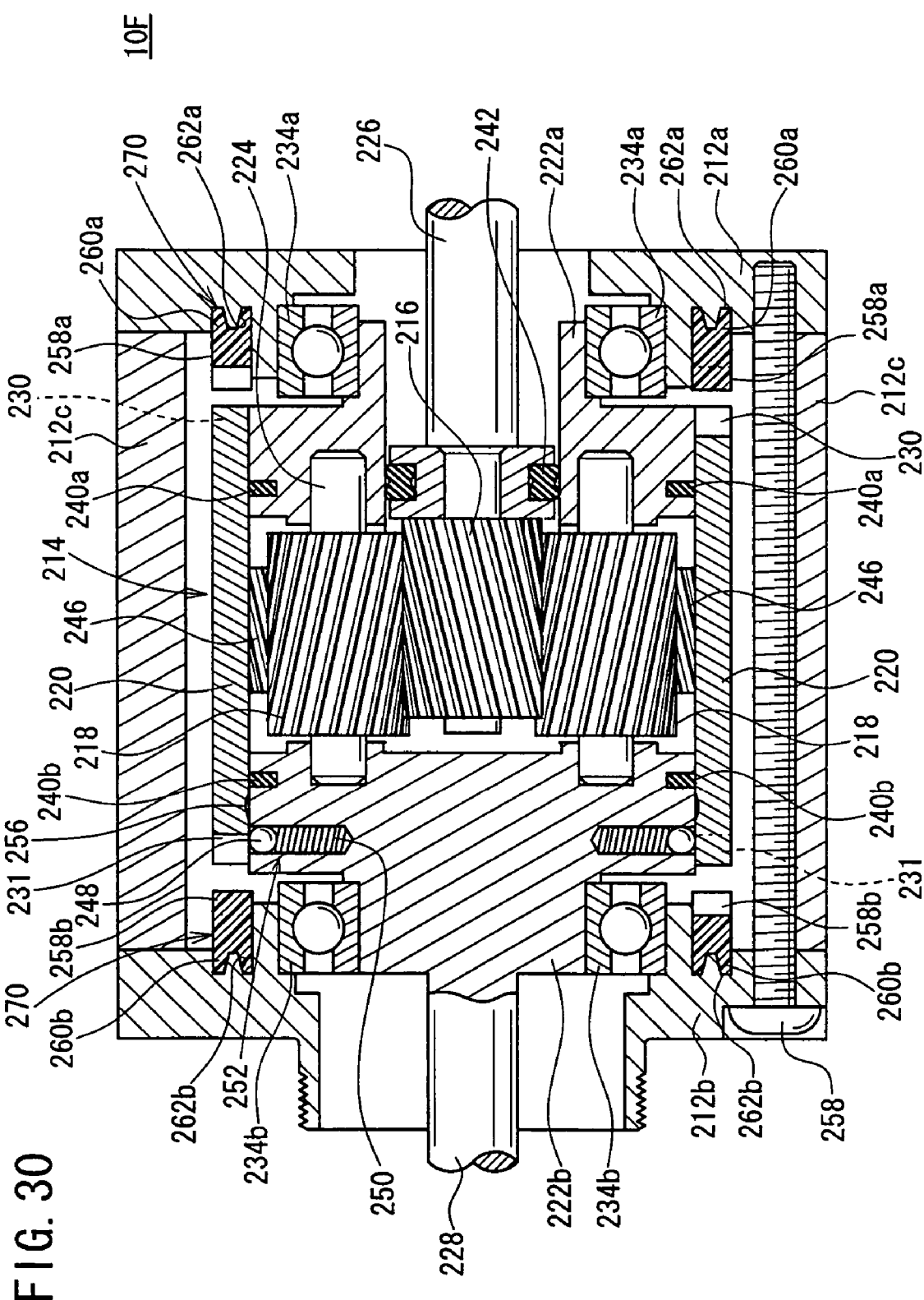
FIG. 30 is a longitudinal sectional view illustrating an automatic speed reducing ratio-switching apparatus according to a seventh embodiment of the present invention.

FIG. 30 shows a longitudinal sectional view taken in the axial direction illustrating an automatic speed reducing ratio-switching apparatus 10F according to a seventh embodiment. The automatic speed reducing ratio-switching apparatus 10F is provided with a damper mechanism 270 disposed at portions of engagement between the lock plates 244a, 244b and the internal gear 220 of the automatic speed reducing ratio-switching apparatus 10E according to the sixth embodiment.

Figure 31:
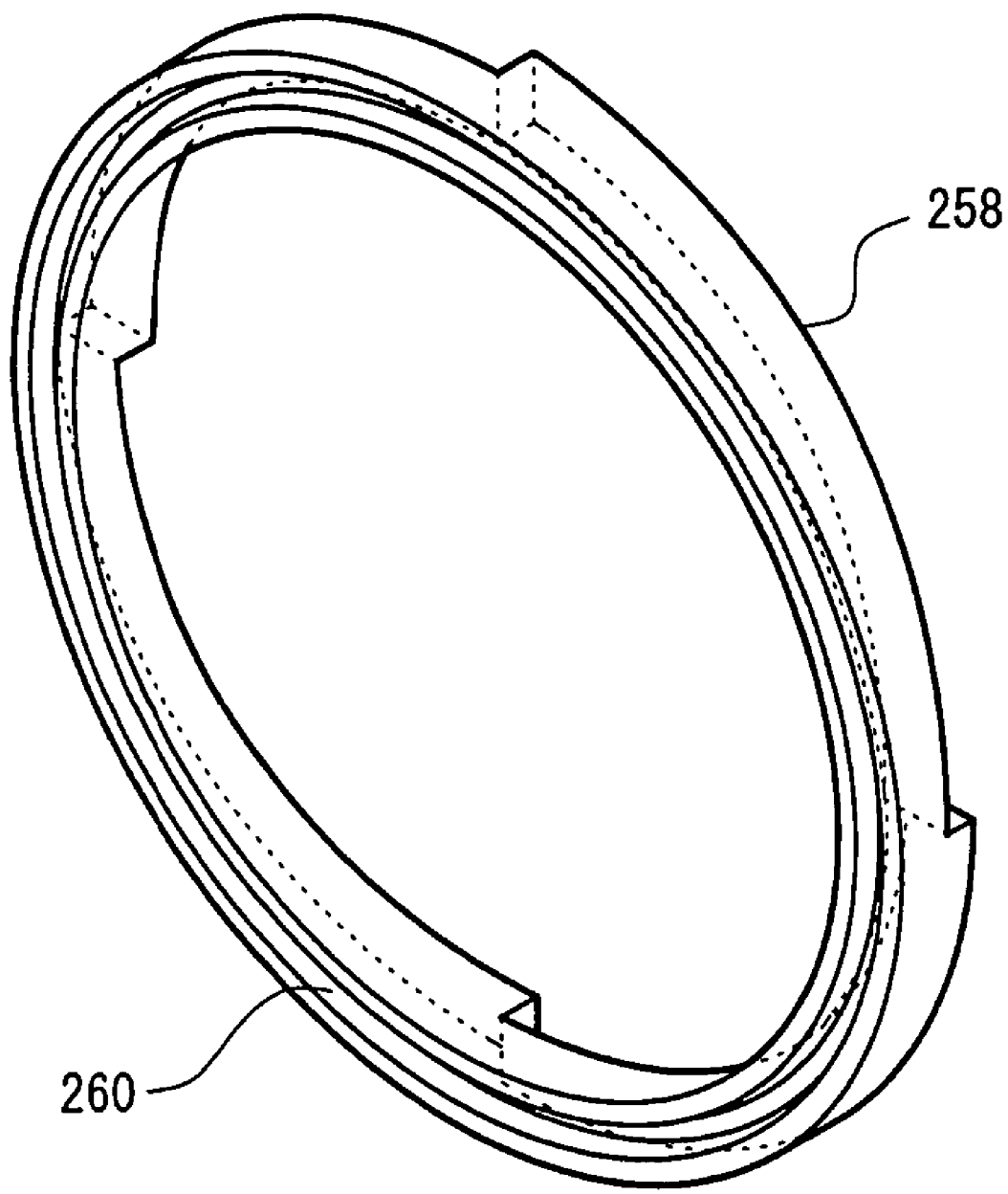
FIG. 31 is a perspective view illustrating a lock plate provided with a damper projection.
Figure 32:
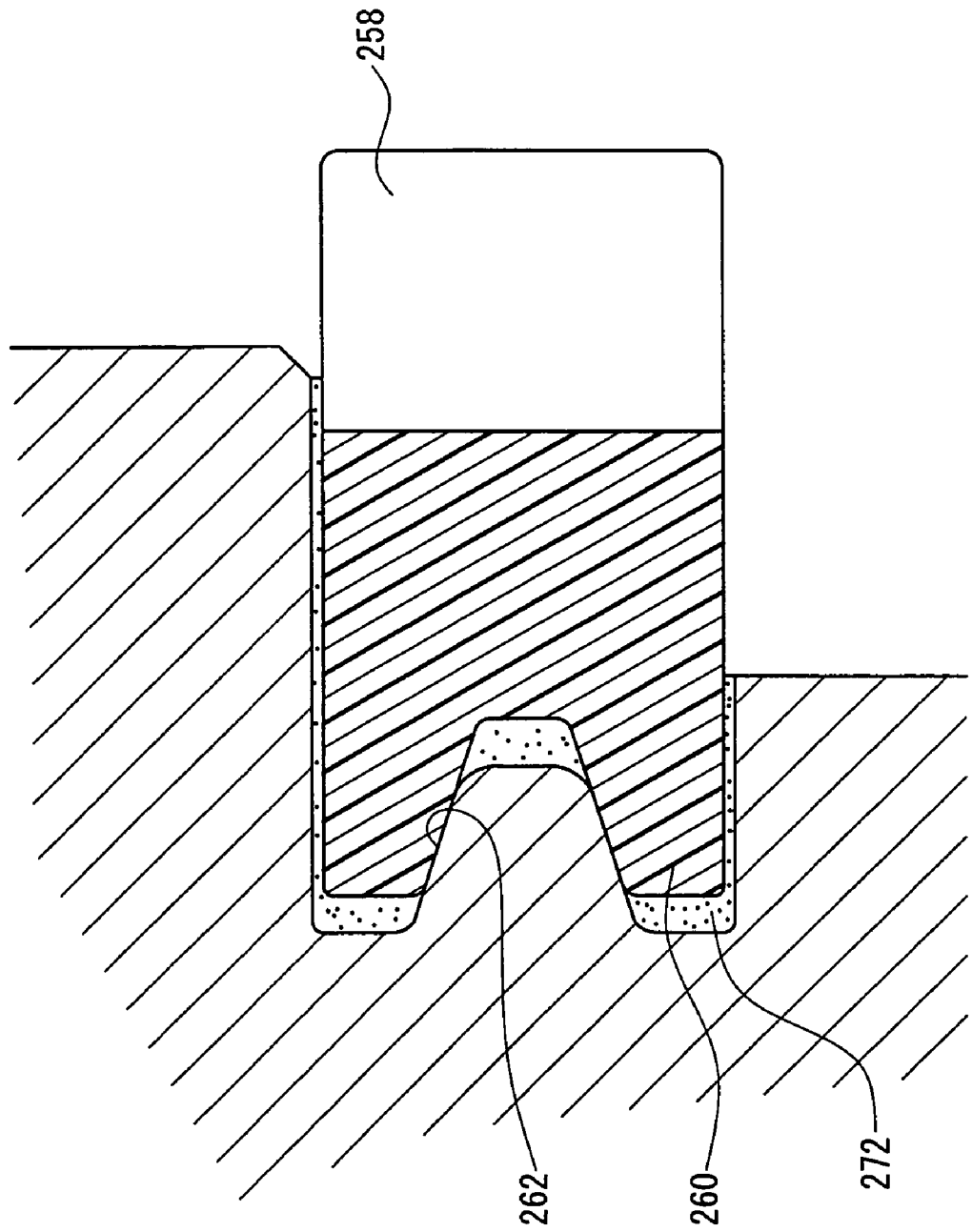
FIG. 32 is a partial magnified longitudinal sectional view illustrating a damper mechanism.

The damper mechanism 270 includes a damper projection 260a having a wedge-shaped cross section which is disposed on the surface opposed to the housing 212a, which is composed of, for example, an elastic member such as synthetic resin or rubber, and which is provided integrally with the lock plate 258a, a damper groove 262a which is formed on the housing 212a to correspond to the damper projection 260a, a damper projection 260b having a wedge-shaped cross section which is disposed on the surface opposed to the housing 212b, which is composed of, for example, an elastic member such as synthetic resin or rubber, and which is provided integrally with the lock plate 258*b*, and a damper groove 262*b* which is formed on the housing 212*b* to correspond to the damper projection 260*b* (see FIGS. 31 and 32).

A viscous member 272 such as oil or grease having a high viscosity is filled in or applied to each of the gaps formed between the damper projection 260*a* and the damper groove 262*a* and between the damper projection 260*b* and the damper groove 262*b* in order to obtain the viscous resistance to function as the damper mechanism 270.

When the damper mechanism 270 is provided, it is possible to reduce the abrasion generated by the abutment between the internal gear 220 and the lock plates 258*a*, 258*b* and the sound generated when the abutment occurs.

That is, when the internal gear 220 is moved in the direction toward the input shaft 226 (or in the direction toward the output shaft 228), then the internal gear lock receiving sections 230*a* to 230*d* (231*a* to 231*d*) of the internal gear 220 abut against the lock plate 258*a* (258*b*) of the damper mechanism 270, and they are meshed with each other. Accordingly, the lock plate 258*a* (258*b*) is rotated integrally with the internal gear 220.

In this situation, when the damper projection 260*a* (260*b*), which is provided integrally with the lock plate 258*a* (258*b*), makes sliding movement along the damper groove 262*a* (262*b*) formed on the side of the housing 212*a* (212*b*), the braking action is effected by the viscous resistance of the viscous member 272, because the viscous member 272 having the high viscosity is provided. The impact, which is generated when the internal gear 220 abuts against the lock plates 258*a*, 258*b*, is buffered (absorbed). As a result, it is possible to appropriately suppress the abrasion generated when the internal gear 220 abuts against the lock plates 258*a*, 258*b* and the sound generated when the abutment occurs.

It is preferable that the gaps, which are formed between the damper projection 260*a* and the damper groove 262*a* and between the damper projection 260*b* and the damper groove 262*b*, are as narrow as possible in order to enhance the efficiency as the damper mechanism 270.

Figure 33:
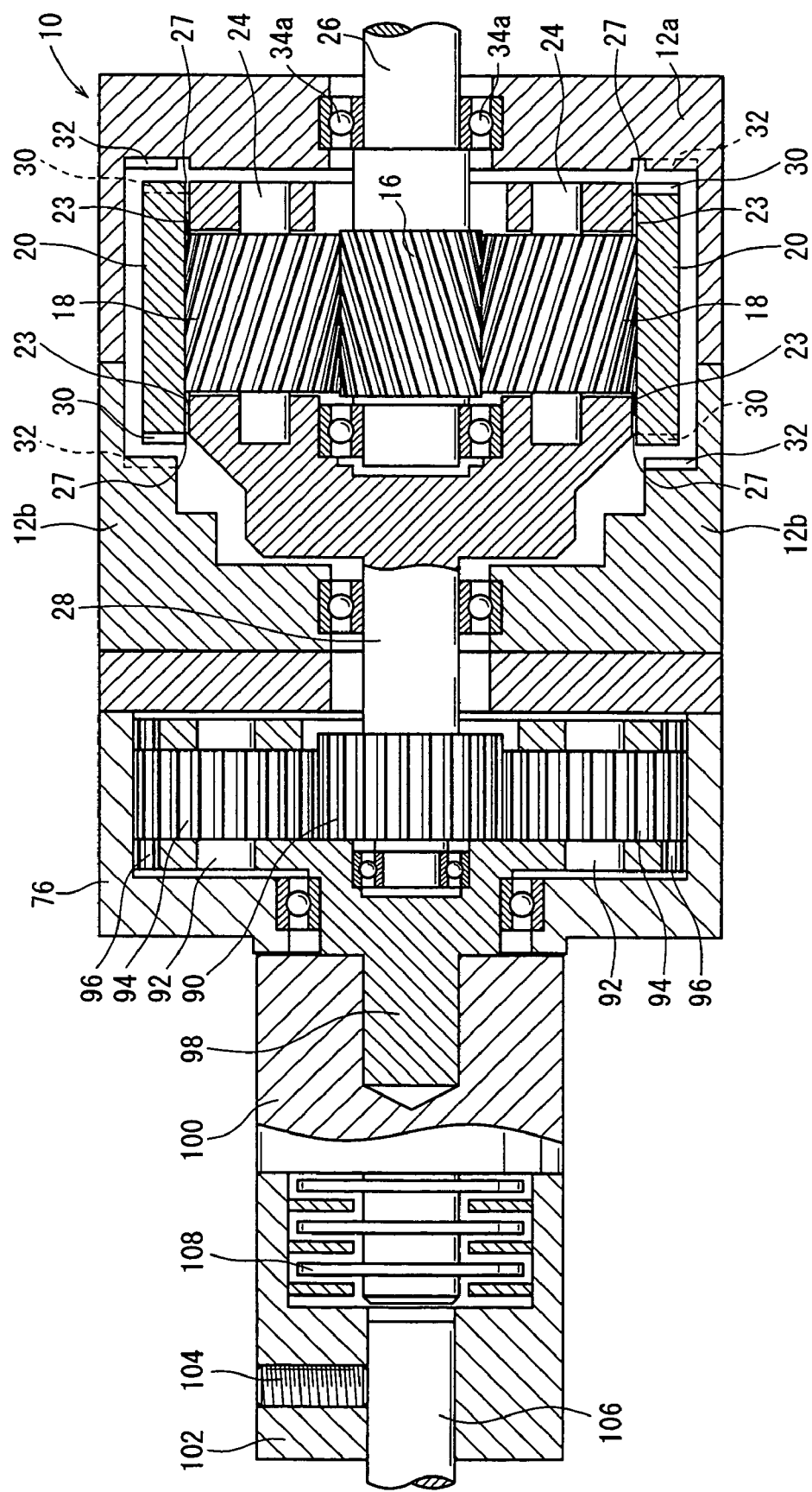
FIG. 33 is a longitudinal sectional view illustrating a state in which an automatic speed reducing unit and a fixed speed reducing ratio speed reducing unit are coupled to one another.

A wide range speed reducing ratio can be obtained by using the automatic speed reducing ratio-switching apparatus 10 according to the first embodiment and a fixed speed reducing ratio speed reducing unit 76 in combination. For example, when the speed reducing ratio of the automatic speed reducing unit 74 is 1:4, and the speed reducing ratio of the fixed speed reducing ratio speed reducing unit 76 is 1:4, then the speed reducing ratio can be changed within a range from 1:4 to 1:16 with respect to the input from planet gears 94. FIG. 33 shows a longitudinal sectional view illustrating a state in which the automatic speed reducing unit 74 and the fixed speed reducing ratio speed reducing unit 76 are connected to one another.

Accordingly, in the pressing apparatus 70, the rotary motion of the electric motor 72 is transmitted from the output shaft 28 to the fixed speed reducing ratio speed reducing unit 76 by the aid of the automatic speed reducing ratio-switching apparatus 10. As shown in FIG. 33, in the fixed speed reducing ratio speed reducing unit 76, a sun gear 90, which is engaged with the output shaft 28, is rotated to rotate the planet gears 94 which are rotatably supported by pins 92 and which are meshed with the sun gear 90 and an internal gear 96 which is meshed with the planet gears 94. The rotation speed, which is transmitted to the internal gear 96, is transmitted to an output shaft 102 via an output shaft 98 and a coupling 100. The coupling 100 and the output shaft 102 are connected to one another by the aid of a viscous coupling section 108. The output shaft 102 is screwed to a shaft 106 by screws 104.

In this arrangement, the actuator, which is connected to the output shaft 28, is not limited to the pressing apparatus 70. It is a matter of course that the actuator includes mechanisms to make reciprocating motion linearly or rotationally, such as an unillustrated fluid pressure cylinder in which a piston rod (displacement member) makes reciprocating motion, a linear actuator in which a slider (displacement member) makes reciprocating motion, a rotary actuator, and a clamp apparatus in which a clamp arm (displacement member) makes reciprocating motion. However, there is no limitation thereto.

Figure 34:
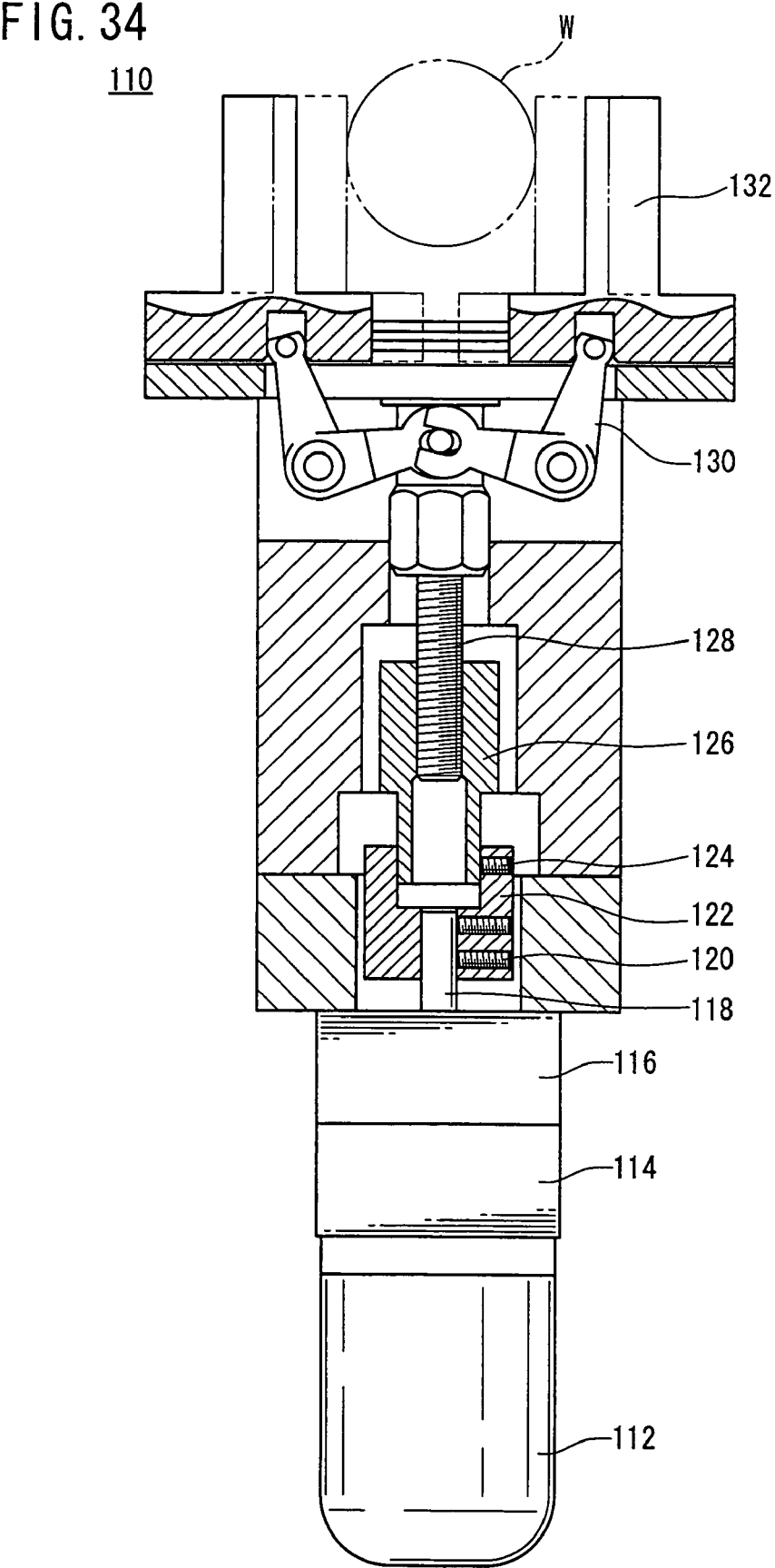
FIG. 34 is a chuck apparatus to which the automatic speed reducing ratio-switching apparatus according to the first embodiment of the present invention is applied.

FIG. 34 shows a chuck apparatus 110 as a kind of the clamp apparatus. The rotary driving force, which is supplied from an electric motor 112, is transmitted to an output shaft 118 via an automatic speed reducing unit 114 incorporated in the automatic speed reducing ratio-switching apparatus 10 and a fixed speed reducing ratio speed reducing unit 116. When the output shaft 118 is rotated, a coupling 122 fastened to a screw 120 and a feed nut 126 fastened to a screw 124 are rotated. When the feed nut 126 is rotated, a feed screw shaft 128, which is engaged with the feed nut 126, is moved in the axial direction. When the feed screw shaft 128 is moved, a gripping section 132 can grip a workpiece W by the aid of arms 130.

Figure 35:
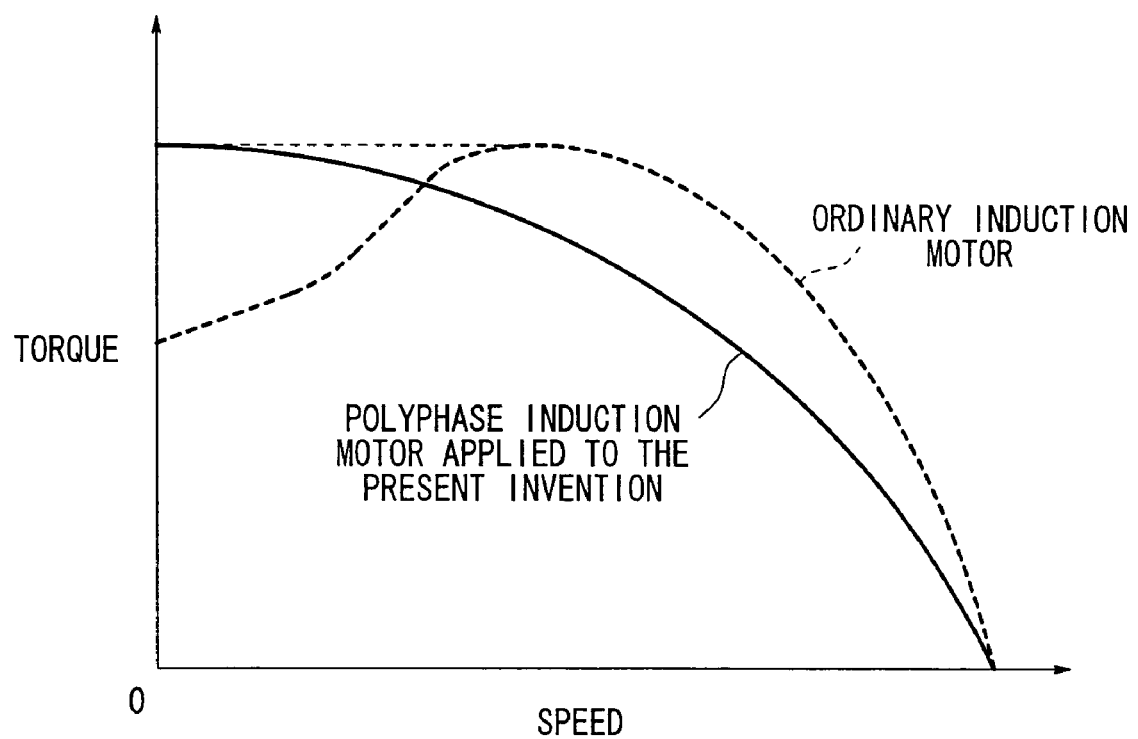
FIG. 35 is a view illustrating the relationship between the speed and the torque in relation to an ordinary induction motor and a polyphase induction motor.

In this arrangement, those usable as the rotary driving source include, for example, a brush-equipped or brushless motor and a polyphase induction motor. Among the rotary driving sources as described above, it is preferable to use a polyphase induction motor composed of an AC servo motor or a stepping motor having a cooling mechanism in which the iron core is formed of silicon steel plate, and the rotor has a cylindrical shape formed of aluminum in order to increase the secondary resistance. FIG. 35 shows the torque characteristic with respect to the speed in relation to the polyphase induction motor as described above and an ordinary induction motor. As shown in FIG. 35, when the polyphase induction motor is used as the rotary driving source for the automatic speed reducing ratio-switching apparatus 10, the torque can be controlled more easily with respect to the speed as compared with the ordinary induction motor. In view of the cost, the polyphase induction motor as described above can be produced more inexpensively than the ordinary induction motor. Further, when an encoder is added, it is also possible to perform the positioning control and the torque control in the same manner as in the ordinary servomotor.

Although certain preferred embodiments of the present invention have been shown and described in detail, it should be understood that various changes and modifications may be made therein without departing from the scope of the appended claims.

What is claimed is:

1. An automatic speed reducing ratio-switching apparatus arranged between a rotary driving source and an actuator for automatically switching a speed reducing ratio for a displacement member operated by a rotary driving force of said rotary driving source, said apparatus comprising:

a planetary gear mechanism including an input shaft which is connected to said rotary driving source, an output shaft which is connected to said actuator, a sun gear, planet gears, and an internal gear which are helical gears respectively, and a carrier which rotatably supports said planet gears and which is rotated integrally in accordance with revolution of said planet gears;

a resistance element which generates a thrust force between said internal gear and said planet gears; and a braking mechanism which brakes rotary motion of said internal gear by moving said internal gear by said thrust force depending on increase or decrease in output load.

2. The automatic speed reducing ratio-switching apparatus according to claim 1, wherein said resistance element is a viscous resistance member.

3. The automatic speed reducing ratio-switching apparatus according to claim 2, wherein said viscous resistance member is provided between said planet gears and an inner section of said carrier internally inserted into said internal gear and between said planet gears and said internal gear.

4. The automatic speed reducing ratio-switching apparatus according to claim 1, wherein said braking mechanism includes an internal gear lock mechanism which stops rotation of and locks said internal gear by meshing internal gear clutches provided at circumferential edges of said internal gear and lock sections provided on housings for accommodating said planetary gear mechanism.

5. The automatic speed reducing ratio-switching apparatus according to claim 1, wherein said braking mechanism includes:

a first internal gear lock mechanism which stops rotation of and locks said internal gear by meshing an internal gear clutch provided at one circumferential edge of said internal gear and a lock section provided on one housing for accommodating said planetary gear mechanism; and a second internal gear lock mechanism which stops rotation of and locks said internal gear by meshing an internal gear clutch provided at the other circumferential edge of said internal gear and a lock section provided on the other housing, and wherein said rotary motion of said internal gear is braked by said first internal gear lock mechanism when said internal gear makes parallel displacement in a direction toward said input shaft, while said rotary motion of said internal gear is braked by said second internal gear lock mechanism when said internal gear makes parallel displacement in a direction toward said output shaft.

6. The automatic speed reducing ratio-switching apparatus according to claim 1, wherein said braking mechanism includes an internal gear lock mechanism which stops rotation of and locks said internal gear by meshing internal gear clutches provided at circumferential edges of said internal gear and lock plates secured to housings.

7. The automatic speed reducing ratio-switching apparatus according to claim 6, wherein a damper mechanism is provided between said housing and said lock plate, and said rotation of said internal gear is stopped by said damper mechanism after meshing said internal gear clutch and said lock plate.

8. The automatic speed reducing ratio-switching apparatus according to claim 1, wherein said carrier is provided with a fastening mechanism, and said internal gear is provided with a groove for making engagement with said fastening mechanism; and said fastening mechanism is engaged with said groove to prevent said internal gear from being moved in a direction toward said input shaft or a direction toward said output shaft when a load, which is not more than a preset torque, is applied from said actuator via said output shaft to said carrier.

9. The automatic speed reducing ratio-switching apparatus according to claim 3, wherein said carrier is provided with a first seal mechanism for avoiding any outflow of said viscous resistance member from said carrier.

10. The automatic speed reducing ratio-switching apparatus according to claim 2, wherein said input shaft is provided with a second seal mechanism for avoiding any outflow, from a side of said input shaft, of said viscous resistance member provided between said sun gear and said planet gears.

11. An automatic speed reducing ratio-switching apparatus arranged between a rotary driving source and an actuator for automatically switching a speed reducing ratio for a displacement member operated by a rotary driving force of said rotary driving source, said apparatus comprising:

a planetary gear mechanism including an input shaft which is connected to said rotary driving source, an output shaft which is connected to said actuator, a sun gear, planet gears, and an internal gear which are helical gears respectively, and a carrier which rotatably supports said planet gears and which is rotated integrally with said output shaft in accordance with revolution of said planet gears, wherein said internal gear is capable of making parallel displacement in a direction toward said input shaft or a direction toward said output shaft, and internal gear clutches are provided at circumferential edges of said internal gear to mesh lock sections provided on housings for accommodating said planetary gear mechanism.

12. The automatic speed reducing ratio-switching apparatus according to claim 11, further comprising:

an internal gear lock mechanism which stops rotation of and locks said internal gear by allowing said internal gear to make said parallel displacement in said direction toward said input shaft or said direction toward said output shaft while said internal gear, which has been rotated in the same rotational direction as that of said sun gear, is rotated in a direction different from said direction of said sun gear so that said internal gear clutch is meshed with said lock section when a load, which exceeds a preset torque, is applied from said actuator via said output shaft to said carrier; and an internal gear lock release mechanism which automatically switches said speed reducing ratio transmitted from said output shaft to said displacement member of said actuator by reversing said sun gear under a driving action of said rotary driving source to release said internal gear from a locked state when said displacement member of said actuator is displaced to move along a returning route from an outward route.

13. The automatic speed reducing ratio-switching apparatus according to claim 12, wherein said internal gear clutches include a plurality of projections which are disposed on both of said circumferential edges of said internal gear, each of which extends in a circumferential direction, and each of which protrudes in a direction toward an axis of rotation; and said lock sections include a plurality of projections which protrude in opposite directions corresponding to said plurality of internal gear clutches.

14. The automatic speed reducing ratio-switching apparatus according to claim 11, further comprising:

an internal gear lock mechanism which stops rotation of and locks said internal gear by allowing said internal gear to make said parallel displacement in said direction toward said input shaft or said direction toward said output shaft while said internal gear, which has been rotated in the same rotational direction as that of said sun gear, is rotated in a direction different from said direction of said sun gear so that said internal gear clutch is meshed with said lock section when a load, which exceeds a preset torque, is applied from said actuator via said output shaft to said carrier; and an internal gear lock release mechanism which automatically switches said speed reducing ratio transmitted from said output shaft to said displacement member of said actuator by allowing said internal gear to make said parallel displacement in said direction opposite to said direction of movement under a driving action of said rotary driving source to release said internal gear from a locked state when a torque, which is applied to said internal gear via said output shaft, is not more than a preset torque.

15. The automatic speed reducing ratio-switching apparatus according to claim 14, wherein annular members, which have said internal gear clutches and which are formed separately from said internal gear, are provided at said circumferential edges of said internal gear so that said annular members are capable of making parallel displacement in said direction toward said input shaft or said direction toward said output shaft, and elastic members, which are interposed between said annular members and said internal gear when said internal gear is subjected to said parallel displacement in said direction toward said input shaft or said direction toward said output shaft, are provided on an outer circumferential surface of said internal gear.

16. An automatic speed reducing ratio-switching apparatus arranged between a rotary driving source and an actuator for automatically switching a speed reducing ratio for a displacement member operated by a rotary driving force of said rotary driving source, said apparatus comprising:

a planetary gear mechanism including an input shaft which is connected to said rotary driving source, an output shaft which is connected to said actuator, a sun gear, planet gears, and an internal gear which are helical gears respectively, and a carrier which rotatably supports said planet gears and which is rotated integrally with said output shaft in accordance with revolution of said planet gears, wherein said planet gears and said carrier are capable of making parallel displacement in a direction toward said input shaft or a direction toward said output shaft, and carrier clutches are provided at circumferential edges of said carrier to mesh lock sections provided on housings for accommodating said planetary gear mechanism.

17. The automatic speed reducing ratio-switching apparatus according to claim 16, further comprising:

a carrier lock mechanism which stops rotation of and locks said carrier by allowing said planet gears and said carrier to make said parallel displacement in said direction toward said input shaft or said direction toward said output shaft while said planet gears and said carrier, which have been rotated in the same rotational direction as that of said sun gear, are rotated in a direction different from said direction of said sun gear so that said carrier clutch is meshed with said lock section when a load, which exceeds a preset torque, is applied from said actuator via said output shaft to said internal gear; and a carrier lock release mechanism which automatically switches said speed reducing ratio transmitted from said output shaft to said displacement member of said actuator by reversing said sun gear under a driving action of said rotary driving source to release said carrier from a locked state when said displacement member of said actuator is displaced to move along a returning route from an outward route.

18. The automatic speed reducing ratio-switching apparatus according to claim 16, further comprising:

a carrier lock mechanism which stops rotation of and locks said carrier by allowing said planet gears and said carrier to make said parallel displacement in said direction toward said input shaft or said direction toward said output shaft while said planet gears and said carrier, which have been rotated in the same rotational direction as that of said sun gear, are rotated in a direction different from said direction of said sun gear so that said carrier clutch is meshed with said lock section when a load, which exceeds a preset torque, is applied from said actuator via said output shaft to said internal gear; and an internal gear lock release mechanism which automatically switches said speed reducing ratio transmitted from said output shaft to said displacement member of said actuator by allowing said planet gears and said carrier to make said parallel displacement in said direction opposite to said direction of movement under a driving action of said rotary driving source to release said carrier from a locked state when a torque, which is applied to said internal gear via said output shaft, is not more than a preset torque.

19. The automatic speed reducing ratio-switching apparatus according to claim 16, wherein said carrier clutches include a plurality of projections which are disposed on both of said circumferential edges of said carrier, each of which extends in a circumferential direction, and each of which protrudes in a direction toward an axis of rotation; and said lock sections include a plurality of projections which protrude in opposite directions corresponding to said plurality of carrier clutches.

20. The automatic speed reducing ratio-switching apparatus according to claim 16, wherein elastic members, which are provided for said carrier, are interposed by said housings and said carrier when said planet gears and said carrier are subjected to said parallel displacement in said direction toward said input shaft or said direction toward said output shaft.

* * * * *